United States Patent
Ishihara et al.

(10) Patent No.: US 10,452,128 B2
(45) Date of Patent: Oct. 22, 2019

(54) INFORMATION PROCESSING APPARATUS AND INFORMATION PROCESSING METHOD

(71) Applicant: SONY CORPORATION, Tokyo (JP)

(72) Inventors: Atsushi Ishihara, Kanagawa (JP); Tsuyoshi Ishikawa, Kanagawa (JP); Hiroyuki Aga, Tokyo (JP); Koichi Kawasaki, Tokyo (JP); Mitsuru Nishibe, Chiba (JP); Yuji Kusano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/560,111

(22) PCT Filed: Feb. 18, 2016

(86) PCT No.: PCT/JP2016/000871
§ 371 (c)(1),
(2) Date: Sep. 20, 2017

(87) PCT Pub. No.: WO2016/157690
PCT Pub. Date: Oct. 6, 2016

(65) Prior Publication Data
US 2018/0101223 A1 Apr. 12, 2018

(30) Foreign Application Priority Data
Mar. 31, 2015 (JP) ................. 2015-073561

(51) Int. Cl.
*G06F 3/01* (2006.01)
*G06F 3/147* (2006.01)
(Continued)

(52) U.S. Cl.
CPC .......... *G06F 3/011* (2013.01); *G02B 27/0172* (2013.01); *G02B 27/0176* (2013.01);
(Continued)

(58) Field of Classification Search
CPC ............................. G06F 3/011; G06T 19/006
See application file for complete search history.

(56) References Cited

U.S. PATENT DOCUMENTS

| | | | |
|---|---|---|---|
| 2012/0206452 A1* | 8/2012 | Geisner ............... | G02B 27/017 345/419 |
| 2013/0335303 A1 | 12/2013 | Maciocci et al. | |

(Continued)

FOREIGN PATENT DOCUMENTS

| | | |
|---|---|---|
| CN | 104335142 A | 2/2015 |
| JP | 2015-519673 A | 7/2015 |
| WO | 2013/188054 A1 | 12/2013 |

OTHER PUBLICATIONS

International Search Report and Written Opinion of PCT Application No. PCT/JP2016/000871, dated Jul. 20, 2016, 19 pages of ISRWO.

(Continued)

*Primary Examiner* — Jeffery A Brier
(74) *Attorney, Agent, or Firm* — Chip Law Group

(57) ABSTRACT

An information processing apparatus including circuitry configured to acquire information indicating a spatial relationship between a real object and a virtual object, and initiate generation of a user feedback based on the acquired information, the user feedback being displayed to be augmented to a generated image obtained based on capturing by an imaging device, or augmented to a perceived view of the real world, and wherein a characteristic of the user feedback is changed when the spatial relationship between the real object and the virtual object changes.

26 Claims, 27 Drawing Sheets

(51) Int. Cl.
*G02B 27/01* (2006.01)
*G06T 19/00* (2011.01)
*G09G 3/00* (2006.01)

(52) U.S. Cl.
CPC .............. *G06F 3/017* (2013.01); *G06F 3/147* (2013.01); *G06T 19/006* (2013.01); *G02B 2027/014* (2013.01); *G02B 2027/0138* (2013.01); *G02B 2027/0178* (2013.01); *G09G 3/003* (2013.01); *G09G 2340/14* (2013.01); *G09G 2354/00* (2013.01)

(56) References Cited

U.S. PATENT DOCUMENTS

| | | | | |
|---|---|---|---|---|
| 2014/0292809 | A1* | 10/2014 | Tsurumi | ................ G06T 19/006 345/633 |
| 2014/0354602 | A1 | 12/2014 | He et al. | |
| 2016/0125656 | A1* | 5/2016 | James | ....................... G06T 7/60 345/633 |

OTHER PUBLICATIONS

International Preliminary Report on Patentability of PCT Application No. PCT/JP2016/000871, dated Oct. 12, 2017, 15 pages of IPRP.
Office Action for EP Patent Application No. 16712095.5, dated Mar. 13, 2019, 13 pages of Office Action.
Office Action for JP Patent Application No. 2015-073561, dated Jun. 18, 2019, 7 pages of Office Action and 6 pages of English Translation.

* cited by examiner

[Fig. 1]
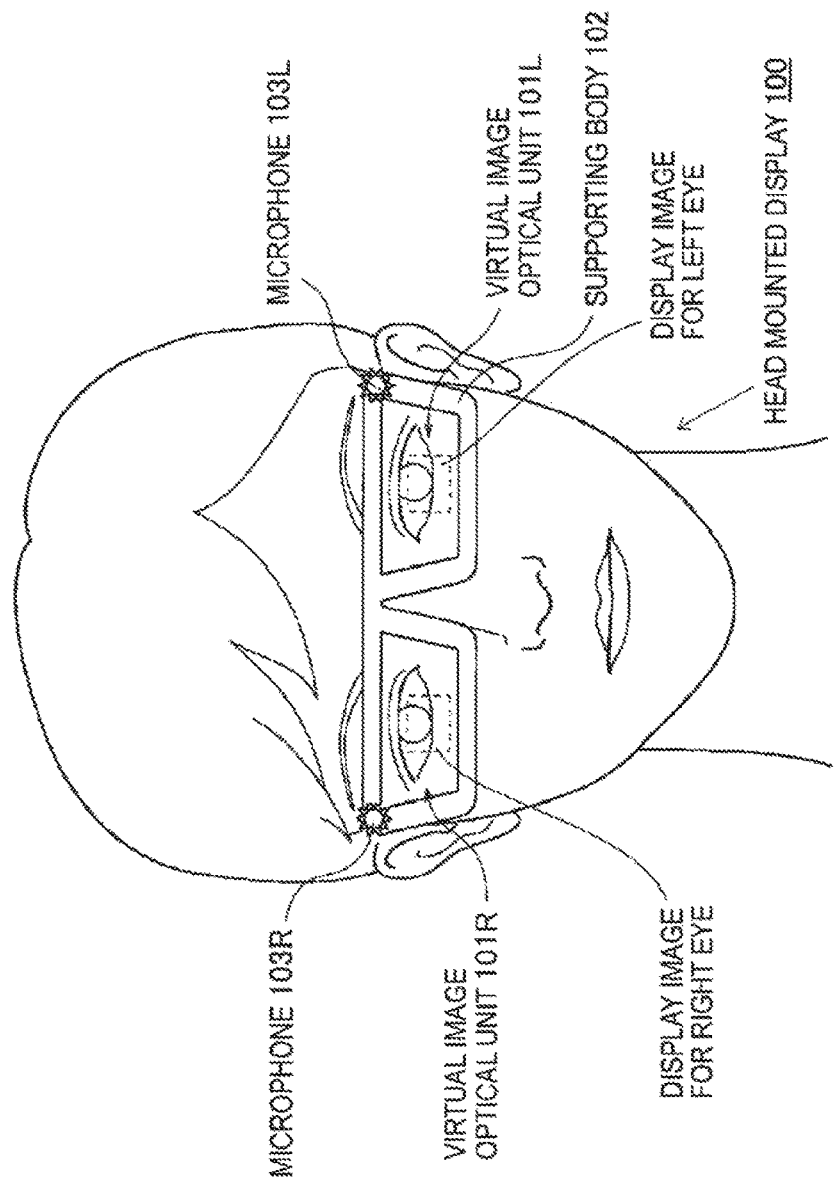

[Fig. 2]
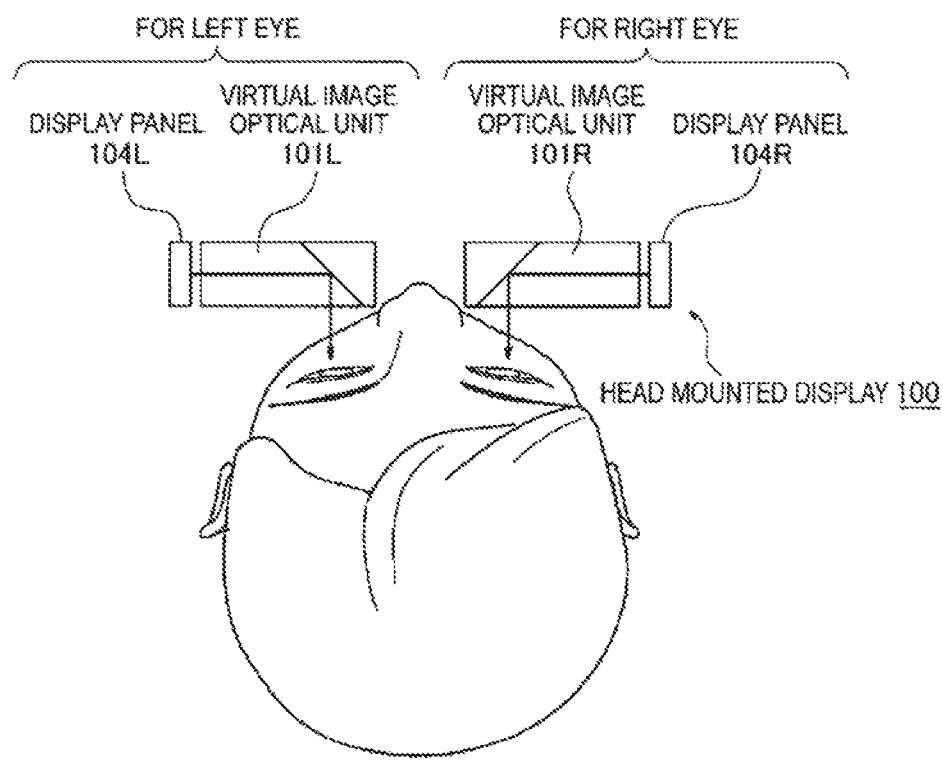

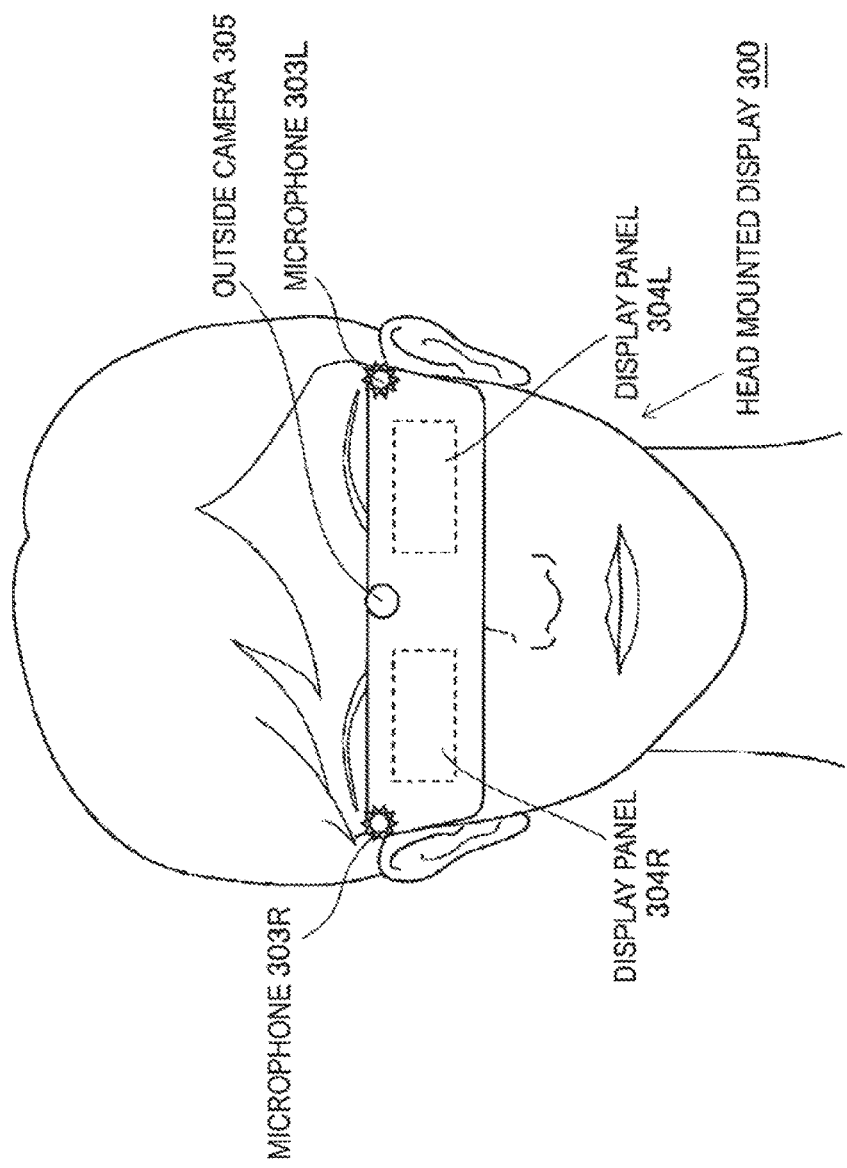
[Fig. 3]

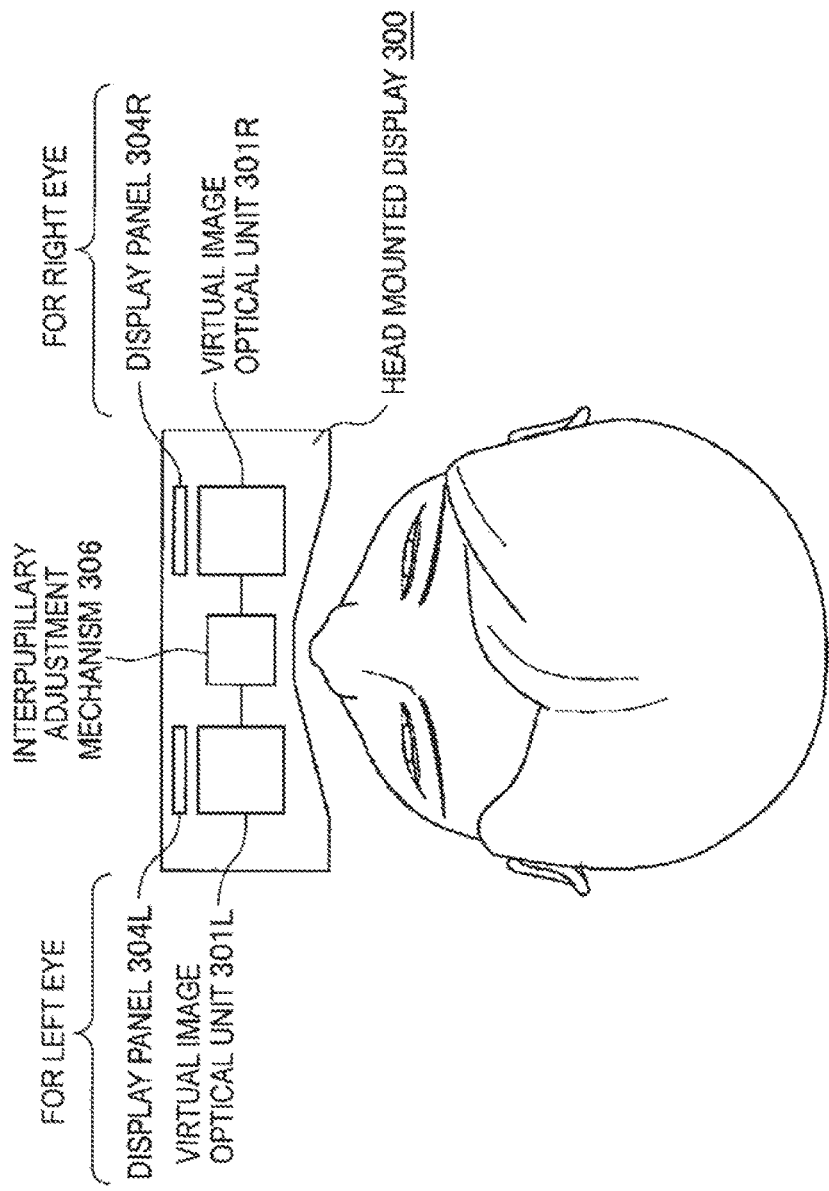
[Fig. 4]

[Fig. 5]
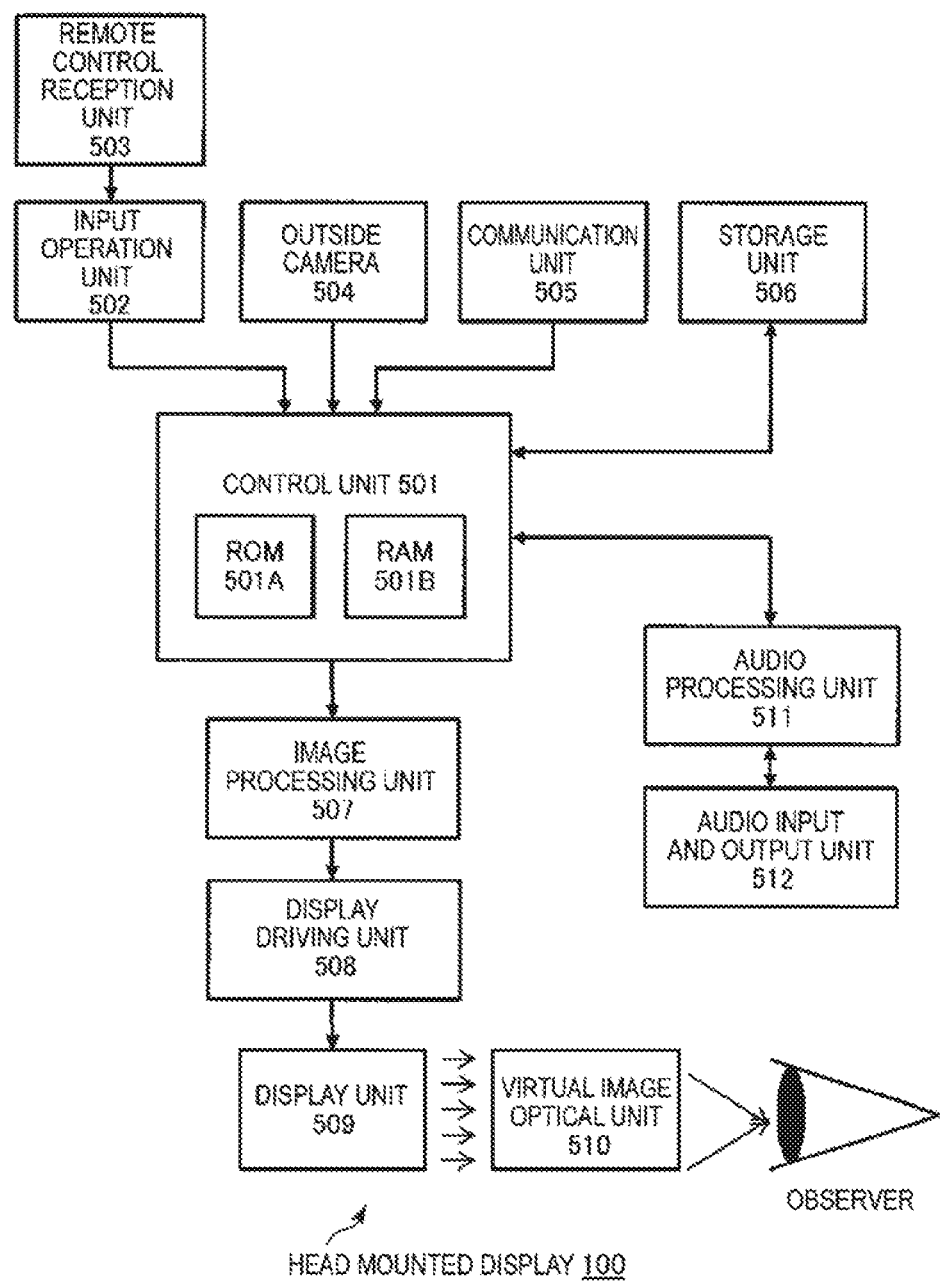

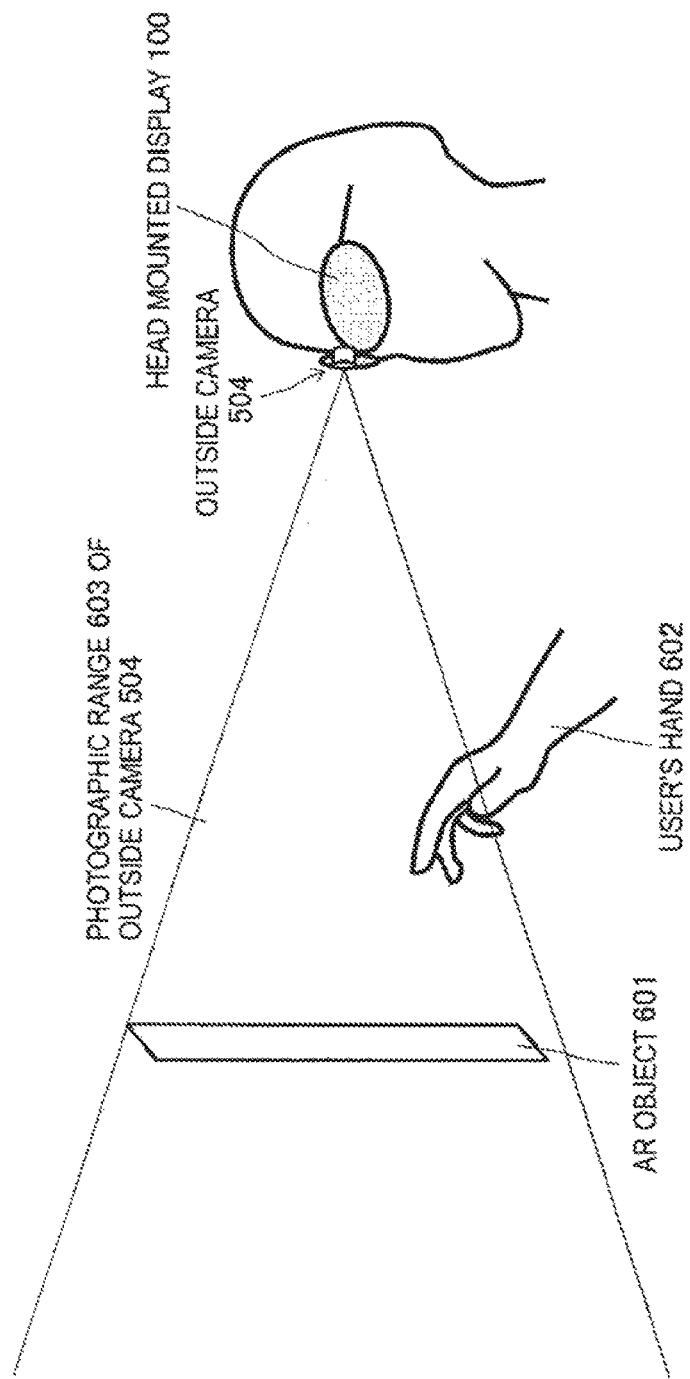
[Fig. 6]

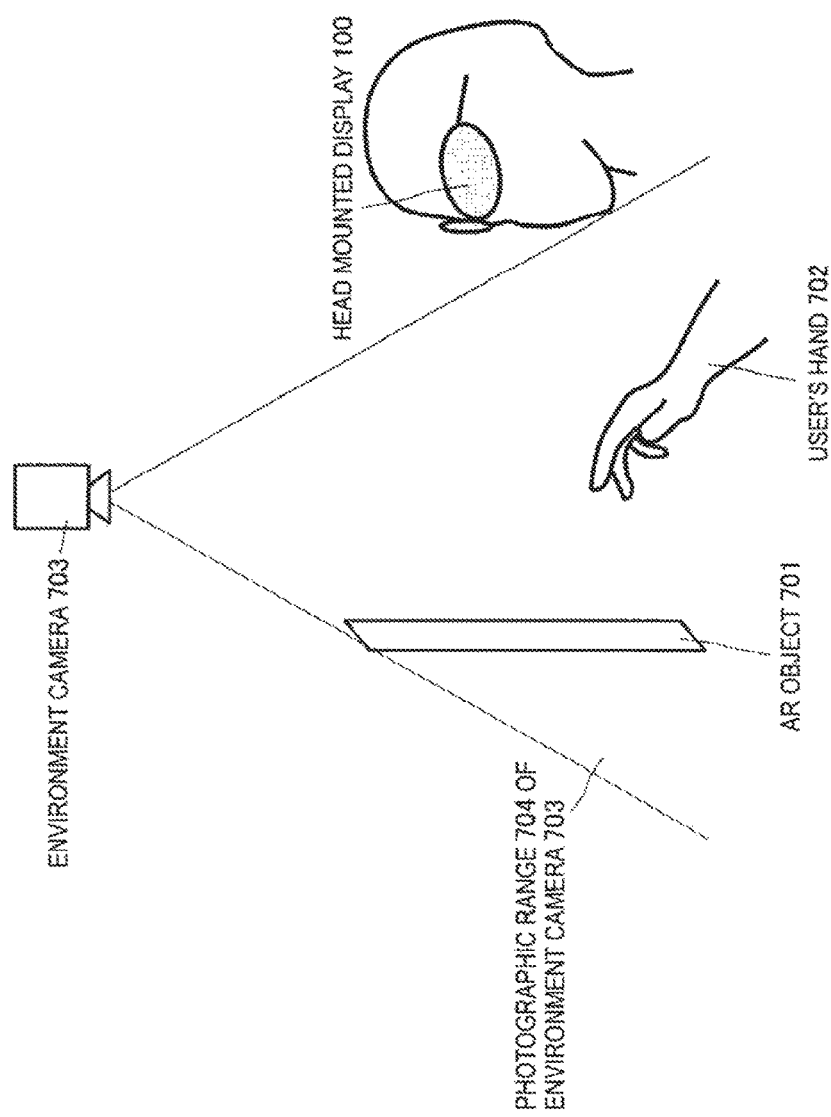

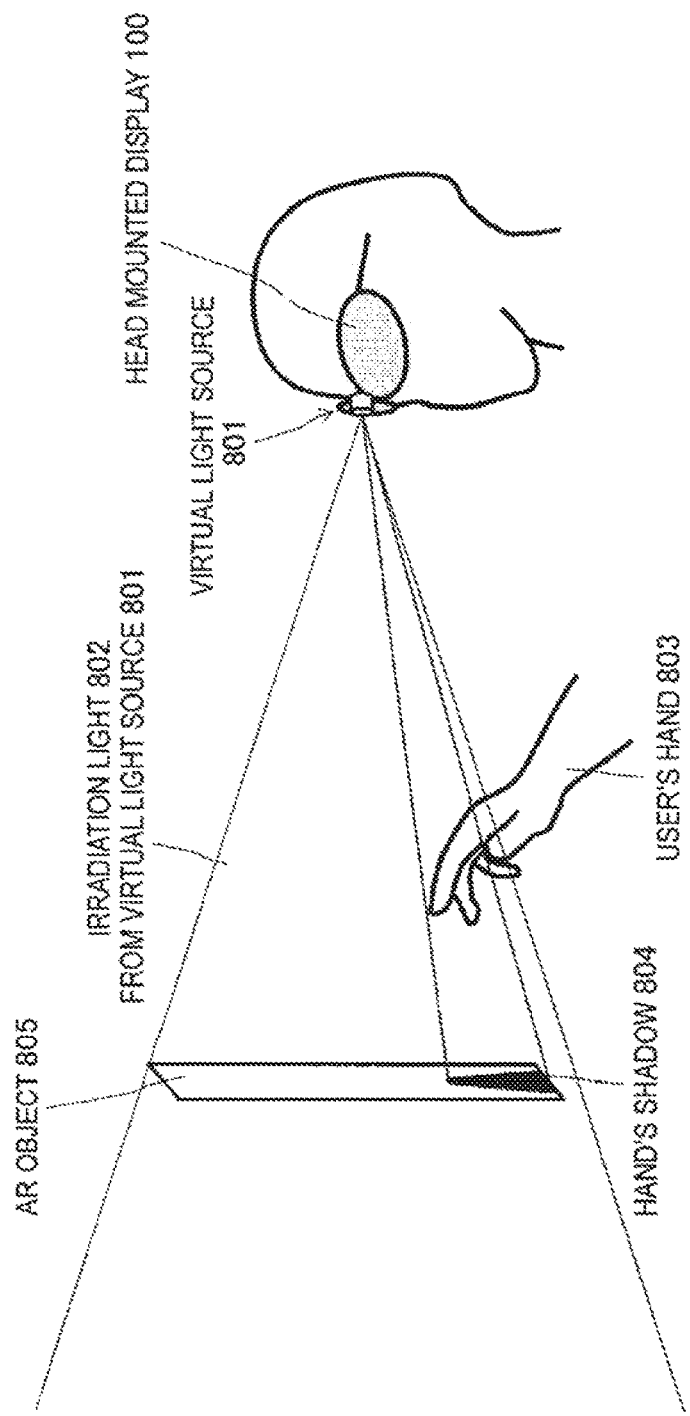
[Fig. 8]

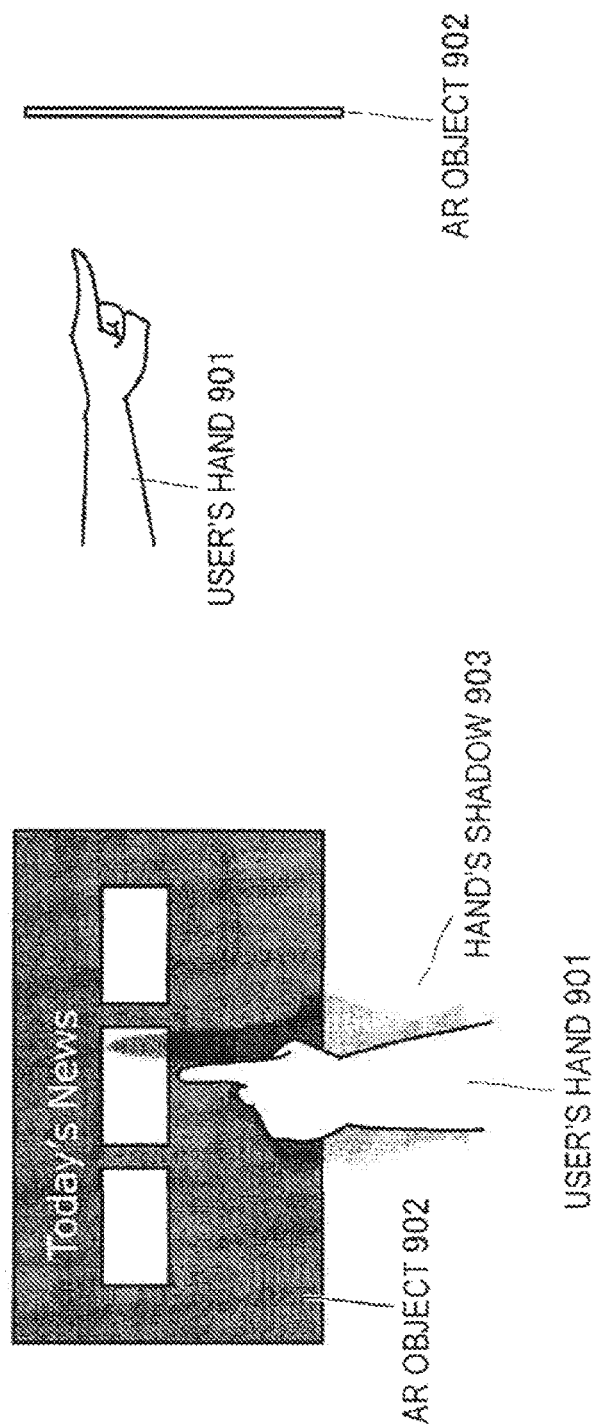
[Fig. 9]

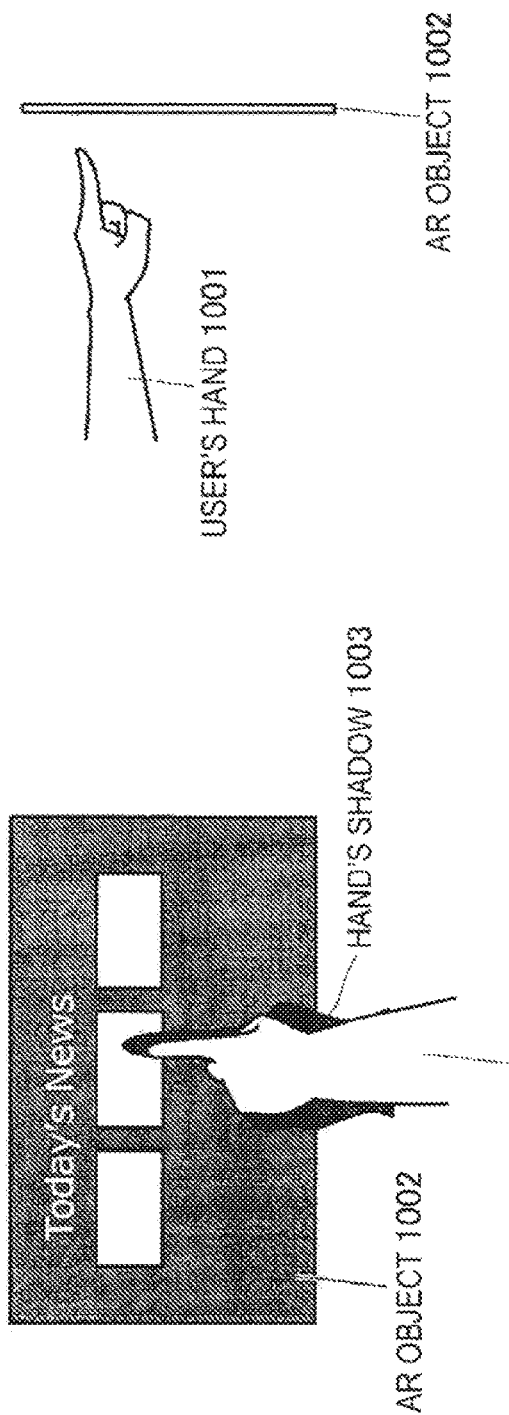
[Fig. 10]

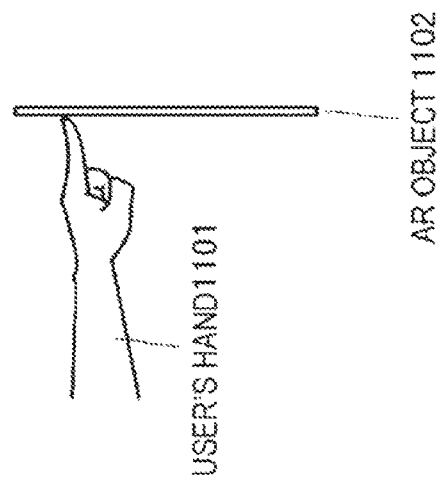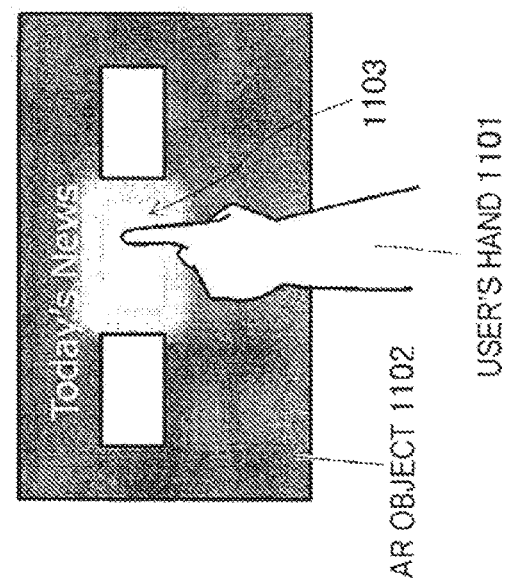
[Fig. 11]

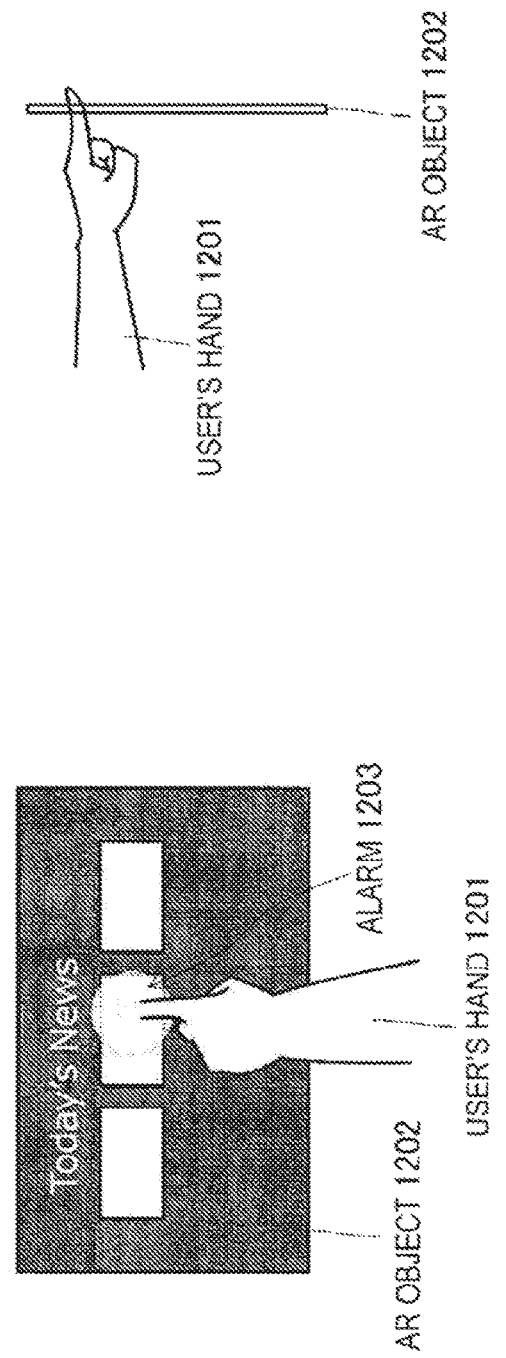

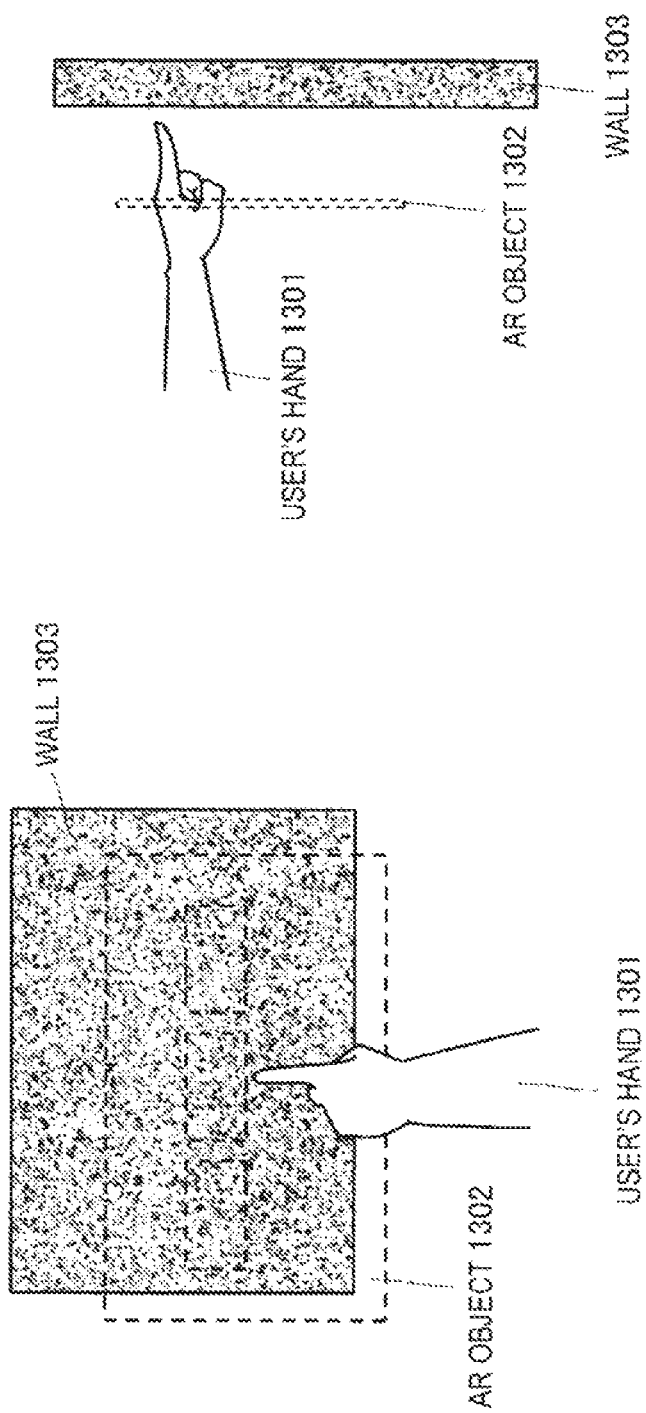
[Fig. 13]

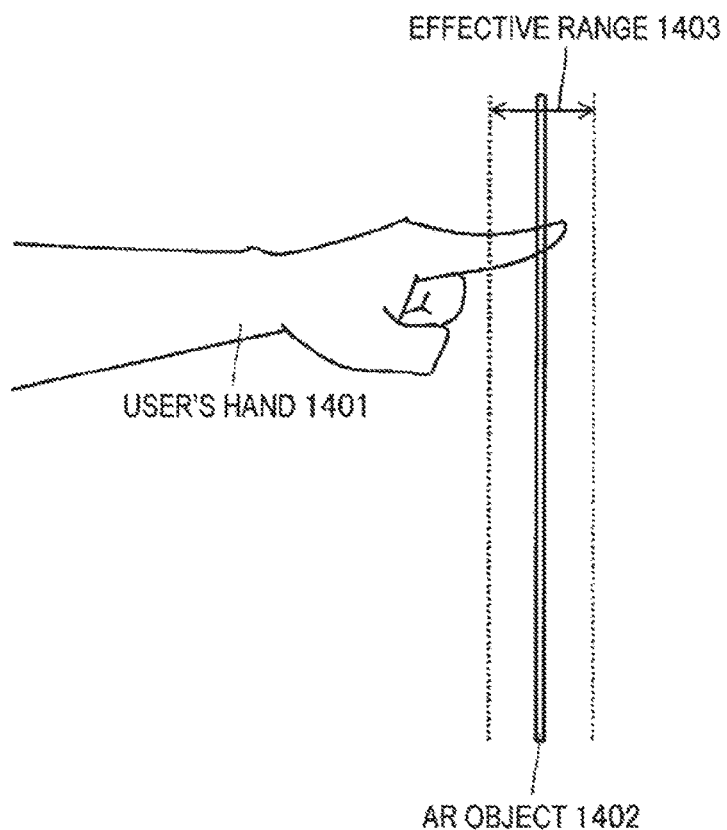
[Fig. 14]

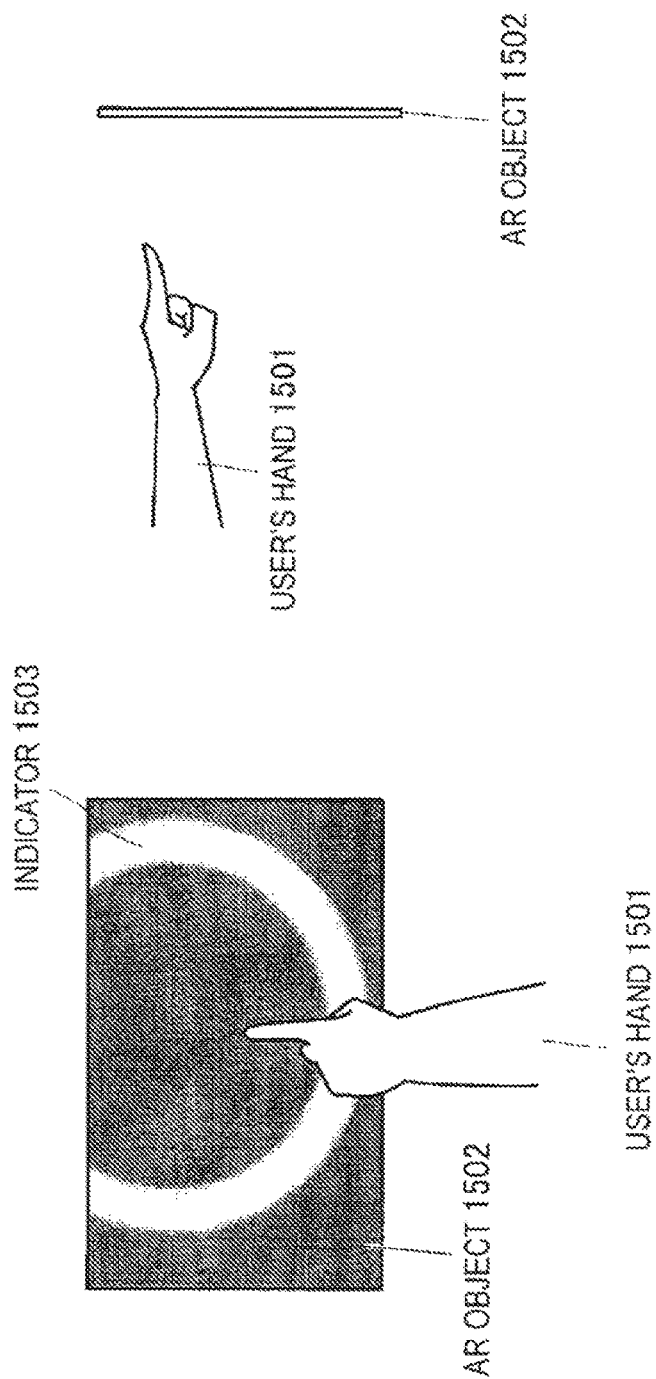
[Fig. 15]

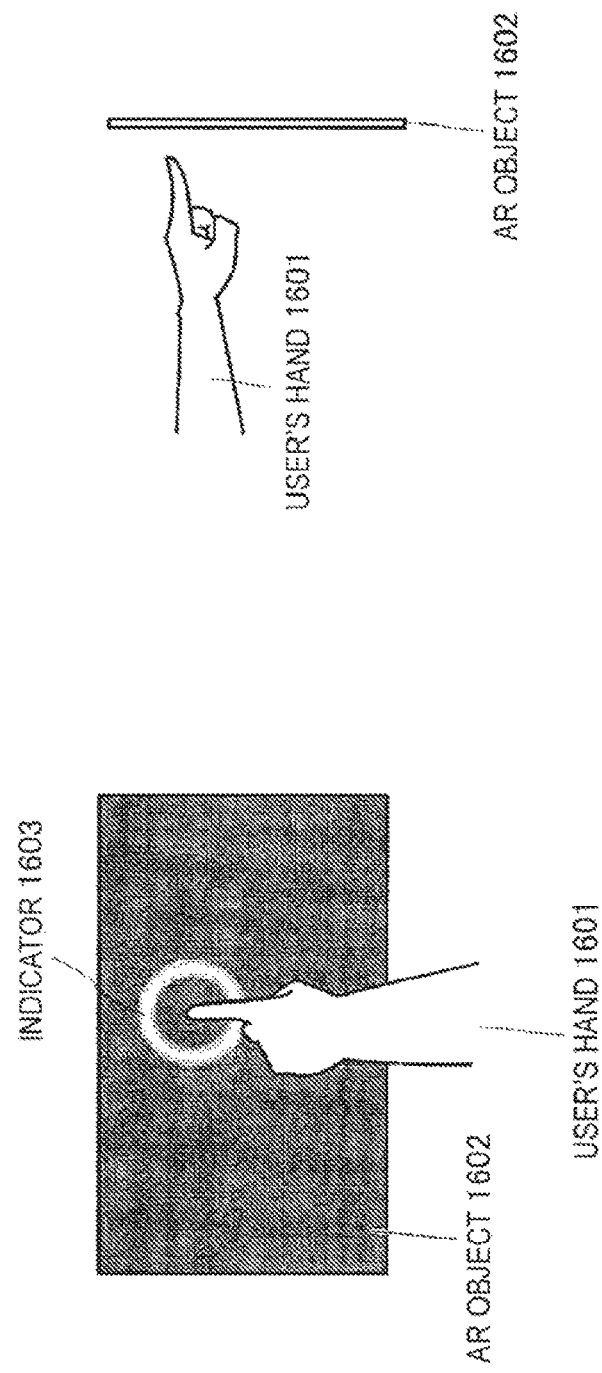
[Fig. 16]

[Fig. 17]
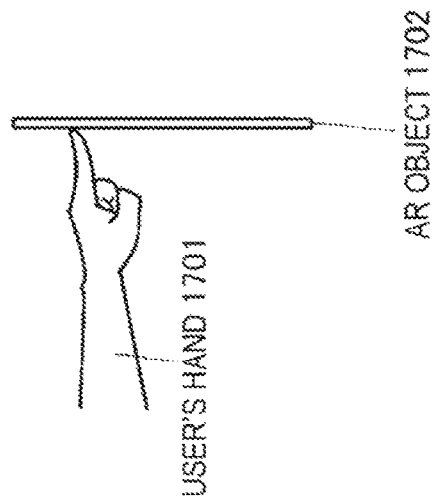
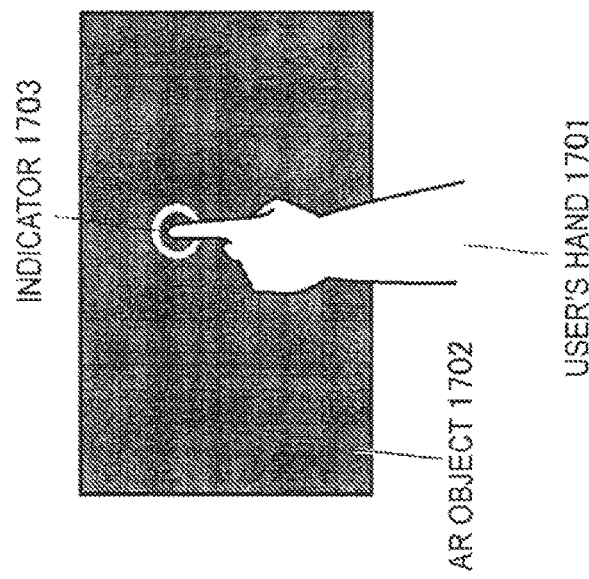

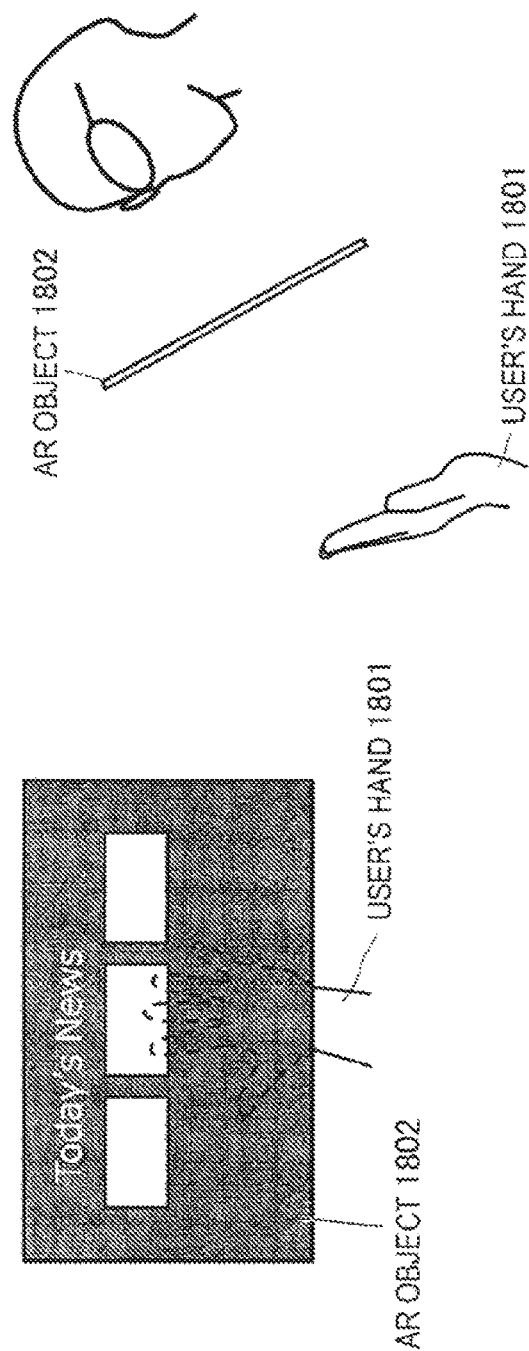
[Fig. 18]

[Fig. 19]
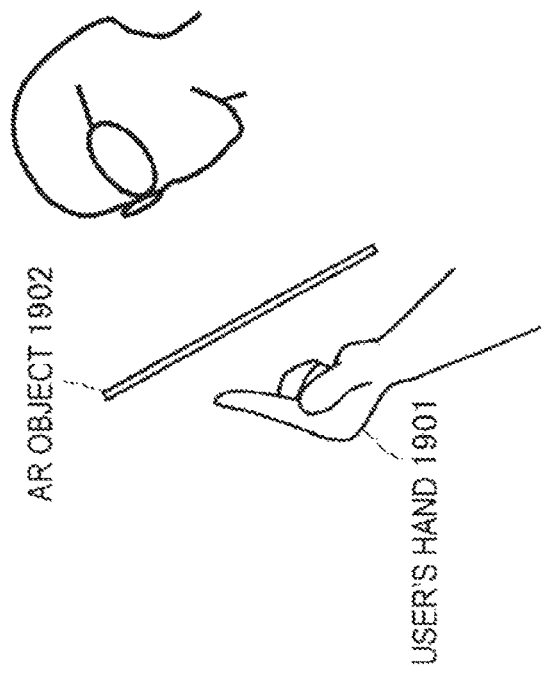
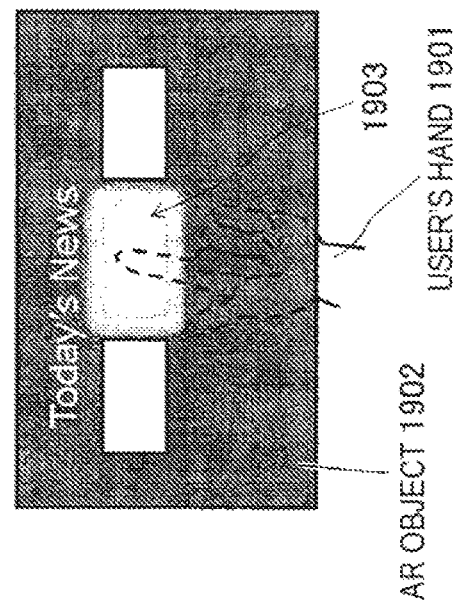

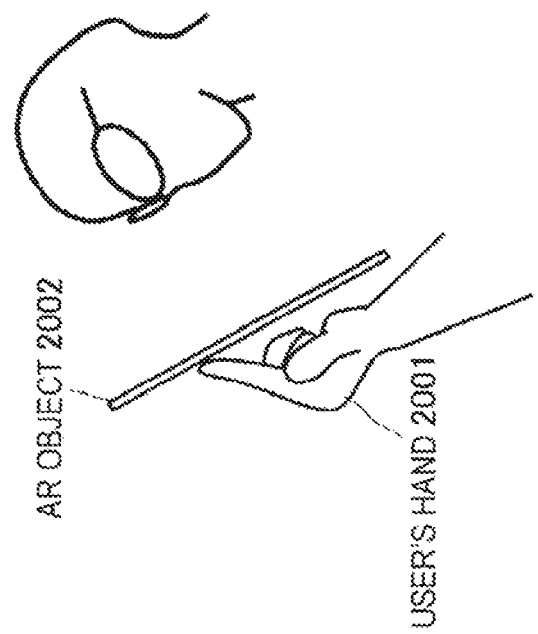
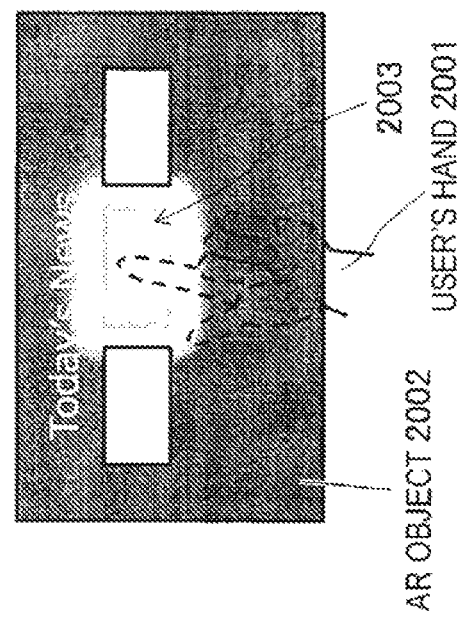
[Fig. 20]

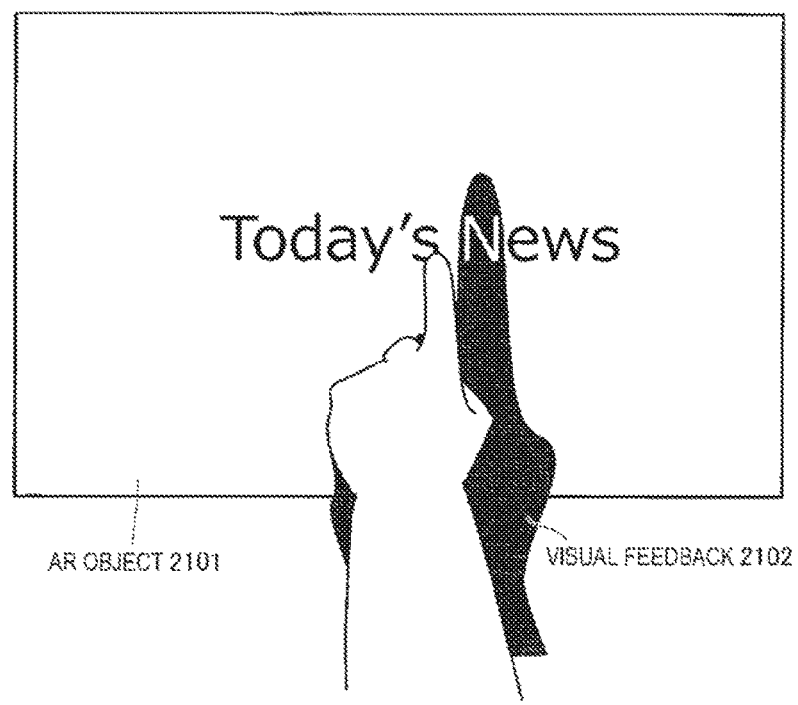
[Fig. 21]

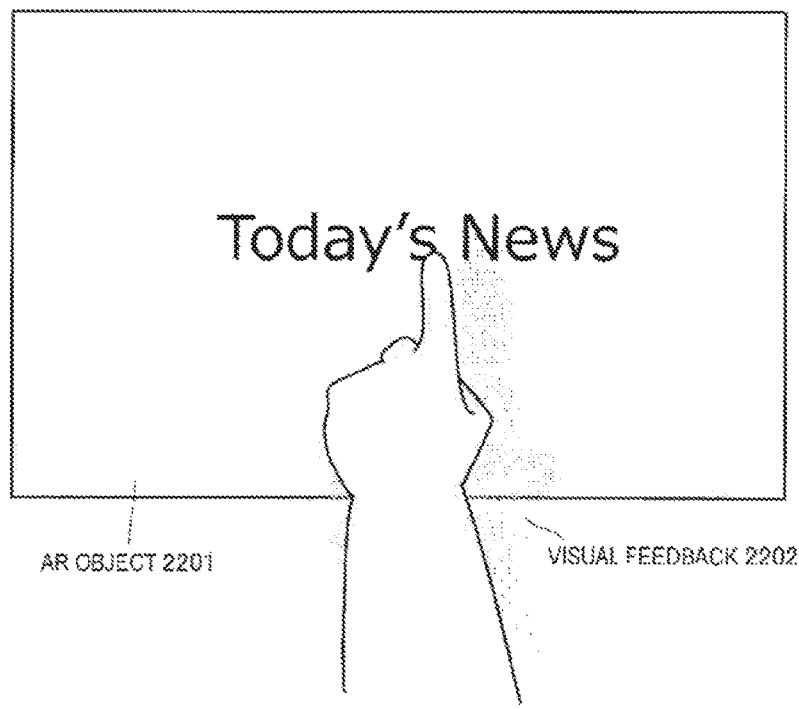
[Fig. 22]

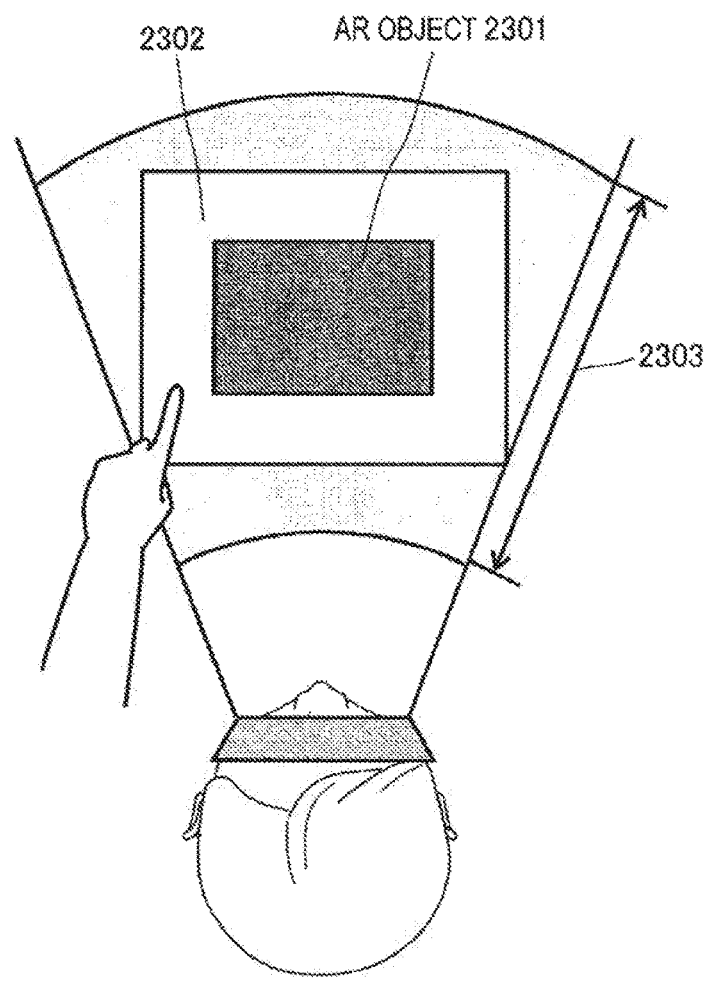
[Fig. 23]

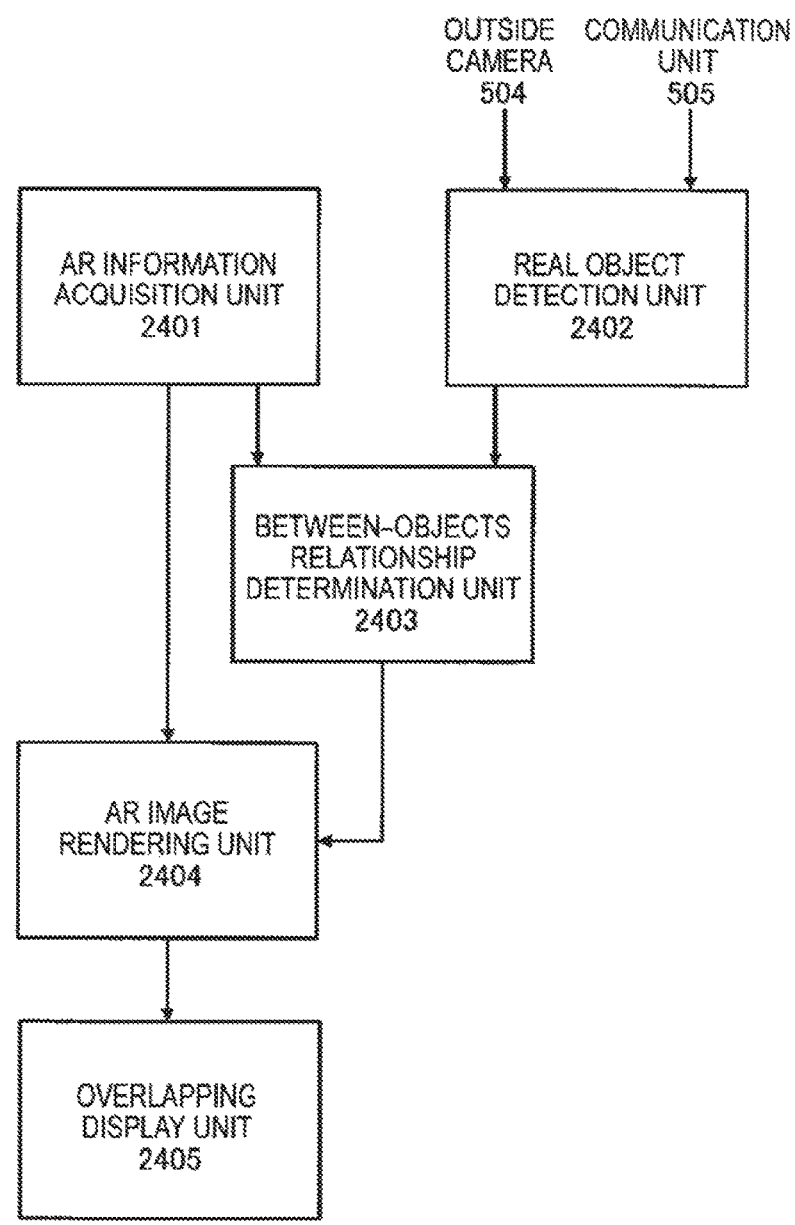
[Fig. 24]

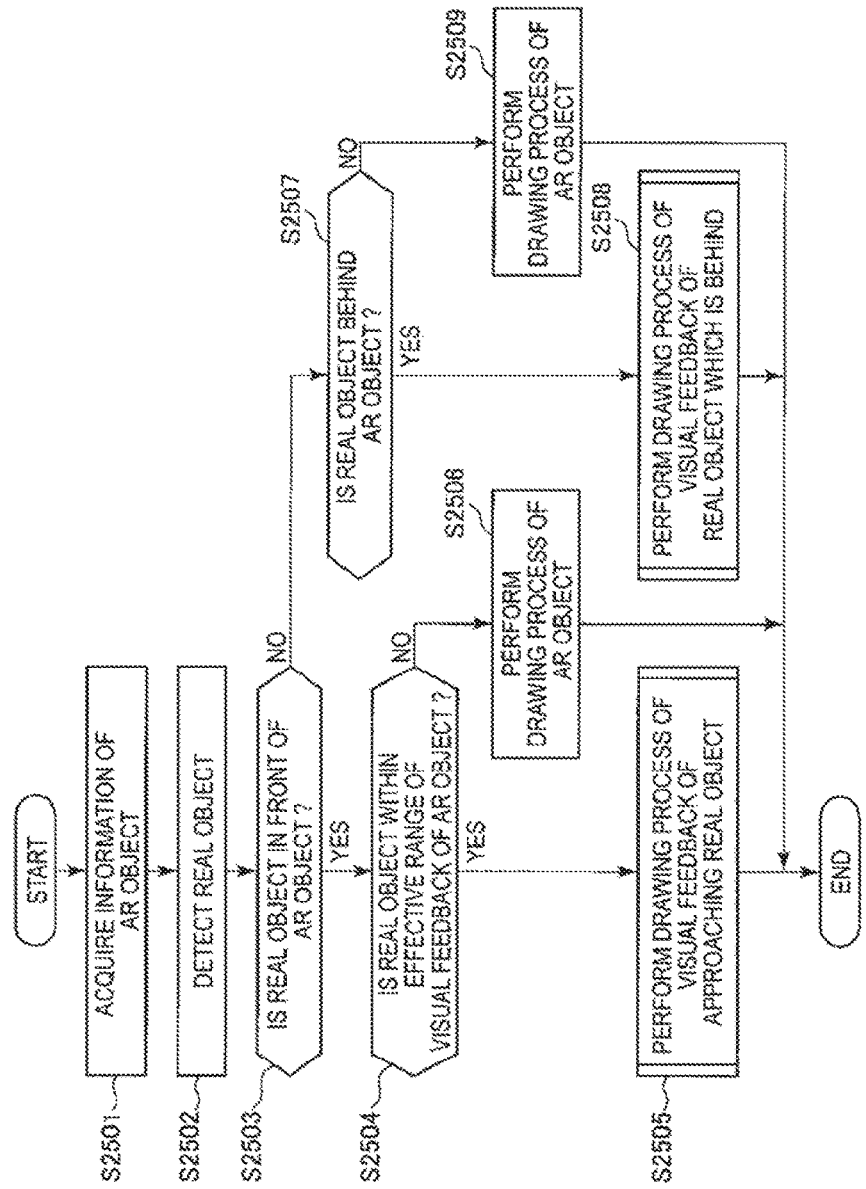
[Fig. 25]

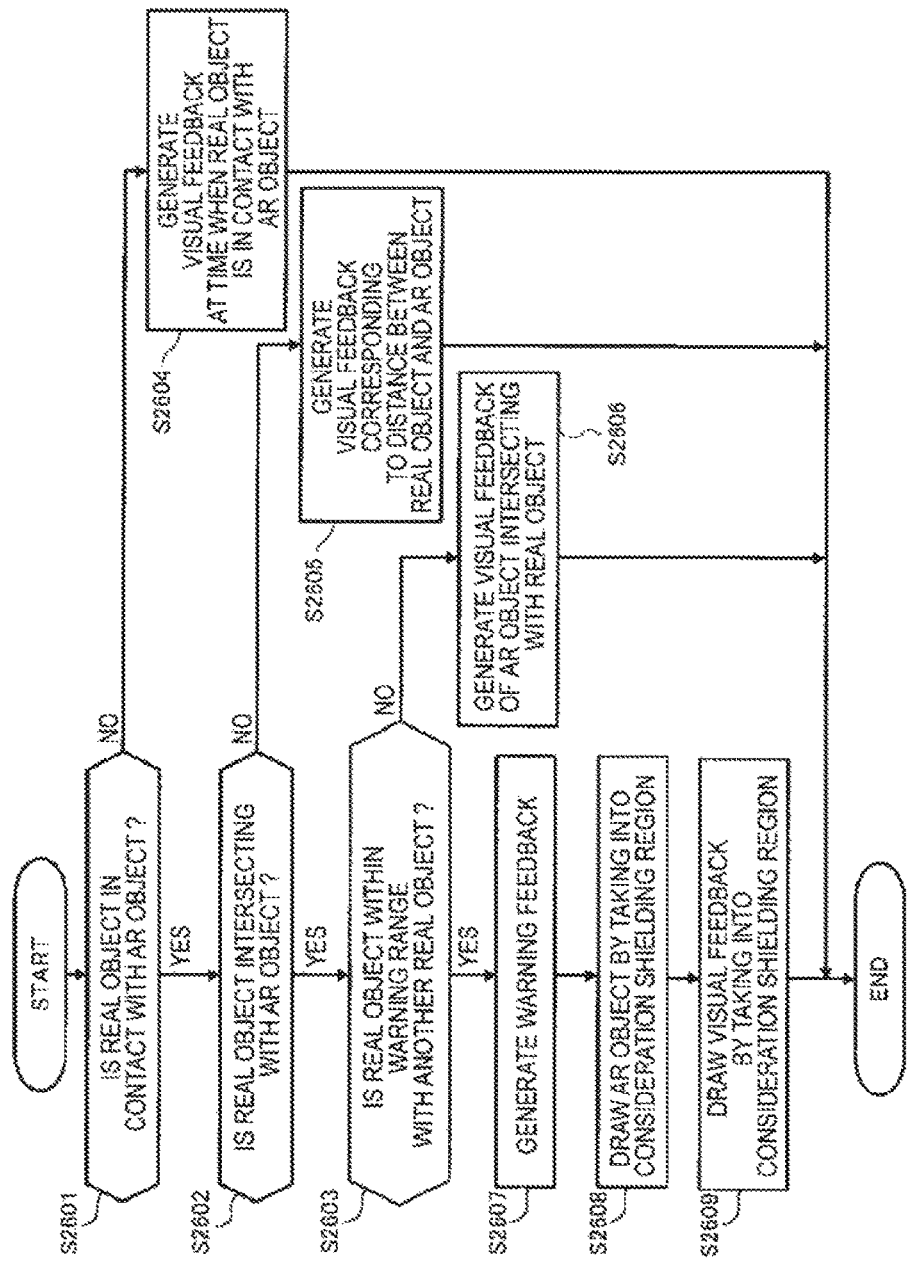
[Fig. 26]

[Fig. 27]
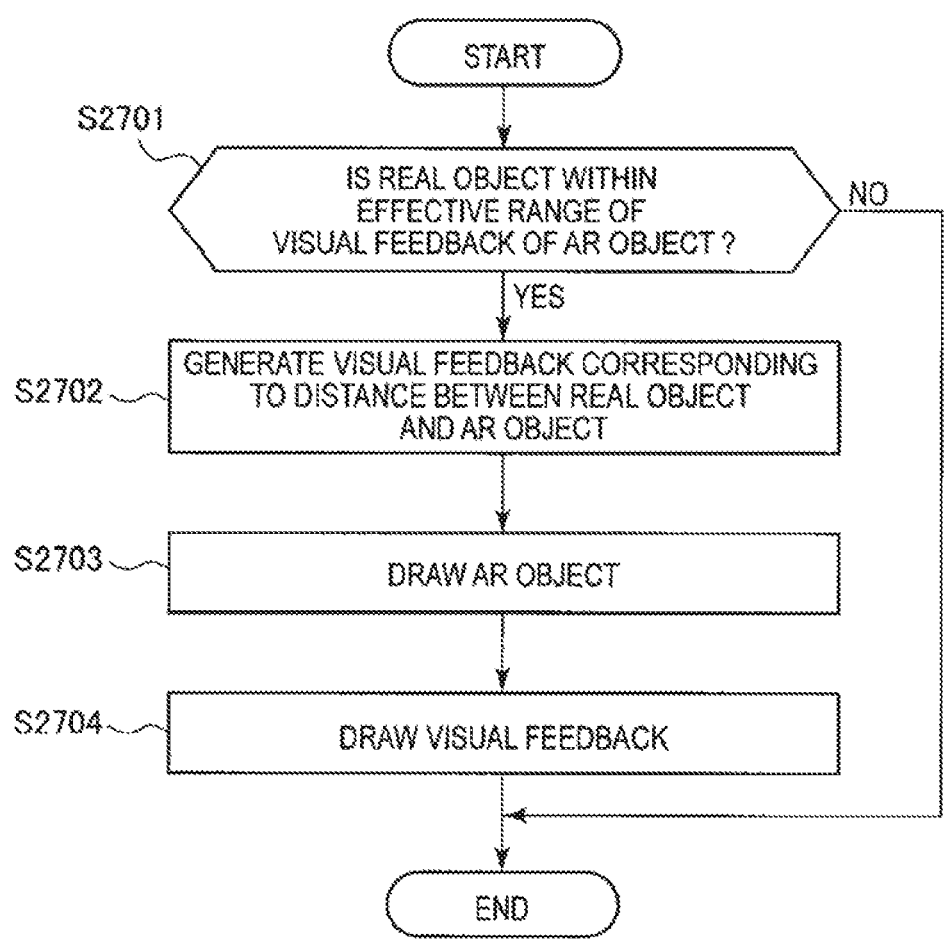

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/000871 filed on Feb. 18, 2016, which claims priority benefit of Japanese Patent Application No. JP 2015-073561 filed in the Japan Patent Office on Mar. 31, 2015. Each of the above-referenced applications is hereby incorporated herein by reference in its entirety.

TECHNICAL FIELD

The technology disclosed in present disclosure relates to an information processing apparatus, an information processing method, and a computer program which processes an Augmented Reality (AR) object displayed in a real space observed by a person.

BACKGROUND ART

AR technology is known which enhances the real world observed by a person, by adding visual information such as a virtual object in a real space. According to AR technology, a user can be made to perceive a virtual object (hereinafter, called an "AR object") so as if it is present in a real space. A head mounted display, used by a person wearing it on his or her head, a small-sized information terminal such as a head-up display, a smartphone or a tablet, a navigation system, a game device or the like can be included as a display apparatus which makes a user visually recognize an AR object at the same time as an image of a real space. By controlling a binocular parallax, a convergence of both eyes, and a focal length in these display apparatus, an AR object can be made to be stereoscopically viewed. Further, by performing a control which changes the drawing of an AR object corresponding to a shadow, a viewpoint position, or a change in a visual line direction, a stereoscopic feeling of the AR object can be produced.

A dialogue system can also be considered in which a person performs an operation to an AR object by a hand or a finger. However, since an AR object is a virtual object not actually present, a sense of touch is not obtained, even if a person performs a contacting or pressing operation, and so there will be a problem such as an operation by a user being difficult to understand.

For example, an information processing apparatus has been proposed which performs feedback of an operation by stereoscopically displaying a particle, when detecting that a hand of a user has entered into a space region detected by an operation on the space (for example, refer to PTL 1). According to such an information processing apparatus, a user can visually recognize that his or her hand has entered into a space region capable of detecting an operation. However, since visual feedback such as a display of a particle is not able to be given at the time when not entering into a space region capable of detecting, it will be difficult to obtain a specific position relationship or depth information such as whether the hand of the user himself or herself is in front or behind the space region, or whether the hand of the user himself or herself is close to or far from the space region.

CITATION LIST

Patent Literature

[PTL 1]
JP 2012-256104A

SUMMARY

Technical Problem

The present inventors of the technology disclosed in the present disclosure have provided an excellent information processing apparatus, information processing method, and computer program capable of suitably processing a virtual object visually recognized by a user at the same time as an image of a real space.

Solution to Problem

According to an embodiment of the present disclosure, there is provided an information processing apparatus including circuitry configured to acquire information indicating a spatial relationship between a real object and a virtual object, and initiate generation of a user feedback based on the acquired information, the user feedback being displayed to be augmented to a generated image obtained based on capturing by an imaging device, or augmented to a perceived view of the real world, wherein a characteristic of the user feedback is changed when the spatial relationship between the real object and the virtual object changes.

Further, according to an embodiment of the present disclosure, there is provided an information processing method including acquiring information indicating a spatial relationship between a real object and a virtual object, generating a user feedback based on the acquired information and displaying the user feedback to be augmented to a generated image obtained based on capturing by an imaging device, or augmented to a perceived view of the real word, wherein a characteristic of the user feedback is changed when the spatial relationship between the real object and the virtual object changes.

Further, according to an embodiment of the present disclosure, there is provided a non-transitory computer-readable medium having embodied thereon a program, which when executed by a computer causes the computer to execute a method including acquiring information indicating a spatial relationship between a real object and a virtual object, generating a user feedback based on the acquired information; and displaying the user feedback to be augmented to a generated image obtained based on capturing by an imaging device, or augmented to a perceived view of the real word, wherein a characteristic of the user feedback is changed when the spatial relationship between the real object and the virtual object changes.

Advantageous Effects of Invention

According to one or more embodiments of the technology disclosed in the present disclosure, an excellent information processing apparatus, information processing method, and computer program can be provided, which can add a visual effect showing an operation by a real object to a virtual object.

Note that, the effect described in the present disclosure is merely an example, and the effect of the present disclosure is not limited to this. Further, the present disclosure will often accomplish further additional effects, other than the above described effect.

It is further desirable for the features and advantages of the technology disclosed in the present disclosure to be clarified by a more detailed description based on the attached embodiments and figures, which will be described below.

BRIEF DESCRIPTION OF DRAWINGS

FIG. 1 is a figure which shows a state in which a user wearing a transmission-type head mounted display 100 is viewed from the front.

FIG. 2 is a figure which shows a state in which a user wearing the head mounted display 100 is viewed from above.

FIG. 3 is a figure which shows a state in which a user wearing an immersive-type head mounted display 300 is viewed from the front.

FIG. 4 is a figure which shows a state in which a user wearing the head mounted display 300 is viewed from above.

FIG. 5 is a figure which schematically shows an internal configuration example of the head mounted display 100 shown in FIG. 1 and FIG. 2.

FIG. 6 is a figure which shows an example of a method for understanding a position relationship between an AR object and a real object.

FIG. 7 is a figure which shows another example of a method for understanding a position relationship between an AR object and a real object.

FIG. 8 is a figure which shows a state in which a shadow of a hand of a user is drawn on the surface of an AR object.

FIG. 9 is a figure which illustrates visual feedback corresponding to a distance between a real object and an AR object.

FIG. 10 is a figure which illustrates visual feedback corresponding to a distance between a real object and an AR object.

FIG. 11 is a figure which illustrates visual feedback corresponding to a distance between a real object and an AR object.

FIG. 12 is a figure which illustrates visual feedback corresponding to a distance between a real object and an AR object.

FIG. 13 is a figure which illustrates visual feedback corresponding to a distance between a real object and an AR object.

FIG. 14 is a figure which shows an effective range capable of operating an AR object.

FIG. 15 is a figure which illustrates visual feedback corresponding to a distance between a real object and an AR object.

FIG. 16 is a figure which illustrates visual feedback corresponding to a distance between a real object and an AR object.

FIG. 17 is a figure which illustrates visual feedback corresponding to a distance between a real object and an AR object.

FIG. 18 is a figure which illustrates visual feedback corresponding to a distance between a real object and an opposite surface side of an AR object.

FIG. 19 is a figure which illustrates visual feedback corresponding to a distance between a real object and an AR object.

FIG. 20 is a figure which illustrates visual feedback corresponding to a distance between a real object and an AR object.

FIG. 21 is a figure which shows an example in which an AR object is drawn with a contrasting color to that of visual feedback.

FIG. 22 is a figure which shows an example in which visual feedback is drawn with a contrasting color to that of an AR object.

FIG. 23 is a figure which shows an example in which an effective range of visual feedback is limited.

FIG. 24 is a figure which schematically shows a functional configuration for performing visual feedback for an operation of a user to an AR object.

FIG. 25 is a flow chart which shows a process procedure for performing a drawing process for an AR image attached to visual feedback.

FIG. 26 is a flow chart which shows a process procedure for drawing visual feedback of a real object approaching an AR object.

FIG. 27 is a flow chart which shows a process procedure for drawing visual feedback of a real object behind an AR object.

DESCRIPTION OF EMBODIMENTS

Hereinafter, embodiments of the technology disclosed in the present disclosure will be described in detail while referring to the figures.

A. System Configuration

FIG. 1 shows a state in which a user wearing a transmission-type (see-through) head mounted display 100 is viewed from the front, as an example of a device which presents visual information including an AR object. The user wearing the transmission-type head mounted display 100 can observe the surroundings (real world) through a display image. Therefore, the head mounted display 100 can cause a virtual display image such as an AR object to be viewed overlapping the scenery of the real world.

The head mounted display 100 shown in FIG. 1 is constituted from a structure similar to that of glasses for vision correction. The head mounted display 100 has transparent virtual image optical units 101L and 101R respectively arranged at positions facing the left and right eyes of the user, and has an enlarged virtual image of an image observed by the user (an AR object or the like) formed. Each of the virtual image optical units 101L and 101R are supported by a glasses frame-type supporting body 102.

Further, microphones 103L and 103R are arranged in the vicinity of both the left and right ends of the supporting body 102. By approximately left-right symmetrically including the microphones 103L and 103R at the front surface, and by recognizing only audio located at the center (the voice of the user), noise of the surroundings and other people's voices can be separated, and an incorrect operation can be prevented, for example, at the time of an operation by audio input.

FIG. 2 shows a state in which the head of the user wearing the head mounted display 100 shown in FIG. 1 is viewed from above.

As illustrated, display panels 104L and 104R, which respectively display and output images for the left eye and the right eye, are arranged at both the left and right ends of the head mounted display 100. Each of the display panels 104L and 104R are constituted from a micro display such as a liquid crystal display or an organic EL element (OLED: Organic Light-Emitting Diode). The display panels 104L and 104R can display an AR object or the like overlapping on the scenery of the surroundings (the real word) observed by the user. Left and right display images output from the display panels 104L and 104R are guided up until the vicinity of each of the left and right eyes by the virtual image optical units 101L and 101R, and these enlarged virtual images are focused on the eyes of the user. While a detailed illustration is omitted, the virtual image optical units 101L and 101R each include an optical system which collects irradiation light from the micro display, a light guide plate arranged at a position where passing light of the optical system is incident, a deflection filter which reflects incident light to the light guide plate, and a deflection filter which causes light spread by total reflection within the light guide plate to be emitted towards the eye of the user.

Note that, while an illustration is omitted in FIG. 1 and FIG. 2, the head mounted display 100 may additionally include an outside camera which photographs the scenery in a visual line direction of the user. By applying a process such as image recognition to a photographic image of the outside camera, a real object (for example, a hand of the user, a pointer operated by the user or the like) which performs an operation to an AR object (or this enlarged virtual image) displayed on the display panels 104L and 104R can be specified, and this position and posture can be measured.

Further, FIG. 3 shows a state in which a user wearing an immersive-type head mounted display 300 is viewed from the front, as an example of a device which presents visual information including an AR object.

The immersive-type head mounted display 300 directly covers the eyes of the user at the time when worn by the user on his or her head or face, and gives a sense of immersion to the user while viewing an image. Further, different to the transmission-type head mounted display 100, the user wearing the immersive-type head mounted display 300 is not able to directly view the scenery of the real world. However, by displaying a captured image of an outside camera 305, which photographs the scenery in a visual line direction of the user, the user can indirectly view the scenery of the real world (that is, observe the scenery by a video see-through). It is needless to say that a virtual display image such as an AR image can be viewed overlapping with such a video see-through image.

The head mounted display 300 shown in FIG. 3 has a structure resembling a hat shape, and is constituted so as to directly cover the left and right eyes of the user who is wearing it. Display panels 304L and 304R with which the user observes are respectively arranged at positions facing the left and right eyes on the inside of the main body of the head mounted display 300.

The display panels 304L and 304R are constituted, for example, by a micro display such as an organic EL element or a liquid crystal display. A captured image of the outside camera 305 can be displayed as a video see-through image on the display panels 304L and 304R, and an AR object can be additionally overlapped on this video see-through image.

The outside camera 305 for a surrounding image (visual field of the user) input is provided in approximately the center of the main body front surface of the head mounted display 300. The outside camera 305 can photograph the scenery in a visual line direction of the user. Further, by applying a process such as image recognition to the outside camera 305, a real object (for example, a hand of the user, a pointer operated by the user or the like) can be specified, and this position and posture can be measured.

Further, microphones 303L and 303R are respectively provided in the vicinity of both the left and right ends of the main body of the head mounted display 300. By approximately left-right symmetrically holding the microphones 303L and 303R, and by recognizing only audio located at the center (the voice of the user), noise of the surroundings and other people's voices can be separated, and an incorrect operation can be prevented, for example, at the time of an operation by audio input.

FIG. 4 shows a state in which the head of the user wearing the head mounted display 300 shown in FIG. 3 is viewed from above.

The illustrated head mounted display 300 holds the display panels 304L and 304R for the left eye and the right eye on the side facing the face of the user. The display panels 304L and 304R are constituted, for example, by a micro display such as an organic EL element or a liquid crystal display. Display images of the display panels 304L and 304R are observed by the user as enlarged virtual images by passing through the virtual image optical units 301L and 301R. Further, since there will be personal differences for each user for the eye height and the interpupillary distance, it may be necessary for each of the left and right display systems to perform position alignment with the eyes of the user who is wearing them. In the example shown in FIG. 4, an interpupillary adjustment mechanism 306 is included between the display panel for the right eye and the display panel for the left eye.

FIG. 5 schematically shows an internal configuration example of the head mounted display 100 shown in FIG. 1 and FIG. 2. However, for the sake of convenience, different reference numerals will be attached in FIG. 5, even if the parts are the same as those of FIG. 1 and FIG. 2. Further, the internal configuration of the head mounted display 300 shown in FIG. 3 and FIG. 4 may also be understood as being the same as that of FIG. 5. Hereinafter, each of the units will be described.

A control unit 501 includes a Read Only Memory (ROM) 501A and a Random Access Memory (RAM) 501B. Program codes executed by the control unit 501 and various types of data are stored within the ROM 501A. The control unit 501 starts a display control of an image, by executing a program loaded in the RAM 501B, and integrally controls all of the operations of the head mounted display 100. Navigation and games, and also various application programs which render an AR image visually recognized by a user at the same time as an image of a real space, can be included as programs stored in the ROM 501A and executed by the control unit 501. Further, in the control unit 501, a display process is performed for a photographic image of an outside camera 504 (or an environment camera 703, which will be described below), and a photographic subject or a real object is specified by performing image recognition for a photographic image as necessary. However, other than being executed within the head mounted display 100 (display apparatus main body) which displays an AR image, a process which renders an AR image (which will be described below) can be configured so as to be executed by an external apparatus such as a server on a network, or to execute only a display output by the head mounted display 100 by receiving this calculation result by a communication unit 505.

An input operation unit 502 includes one or more operators for a user to perform an input operation, such as keys, buttons, or switches, accepts an instruction of the user via the operators, and outputs the accepted instruction to the control unit 501. Further, the input operation unit 502 accepts an instruction of the user constituted from a remote control command received from a remote control (not illustrated) by a remote control reception unit 503, and outputs the accepted instruction to the control unit 501.

An outside camera 504 is arranged at approximately the center of the main body front surface of the head mounted display 100, for example, and photographs the scenery in a visual line direction of the user, for example. The outside camera 504 may include a rotation movement function or a viewing angle change (zoom) function in each direction of a pan, tilt, and roll. The user may instruct a posture of the outside camera 504, through the input operation unit 502.

The communication unit 505 performs a communication process with an external device, and a modulation-demodulation and encoding-decoding process of a communication signal. A content reproduction apparatus which supplies viewing content (a Blu-ray Disc or DVD player), a multi-functional information terminal such as a smartphone or a tablet, a game device, a streaming server or the like can be included as a communicating external apparatus. Further, the control unit 501 sends transmission data to the external apparatus from the communication unit 505.

The configuration of the communication unit 505 is arbitrary. For example, the communication unit 505 can be configured, in accordance with a communication system used for a transmission and reception operation with an external apparatus which becomes a communication partner. The communication system may be any wired or wireless form. A Mobile High-definition Link (MHL), a Universal Serial Bus (USB), a High Definition Multimedia Interface (HDMI) (registered trademark), Wi-Fi (registered trademark), Bluetooth (registered trademark) communication, Bluetooth (registered trademark) Low Energy (BLE) communication, ultra-low power consumption wireless communication such as ANT, IEEE802.11s or the like can be included as the communication system stated here. Alternatively, the communication unit 505 may be a cellular wireless transmission and reception device, for example, which operates in accordance with standard specifications such as Wideband Code Division Multiple Access (W-CDMA) or Long Term Evolution (LTE).

The storage unit 506 is a large capacity storage apparatus constituted by a Solid State Drive (SSD) or the like. The storage unit 506 stores application programs executed by the control unit 501 and various types of data. Further, moving images or still images photographed by the outside camera 505 may be stored within the storage unit 506.

The image processing unit 507 additionally performs a signal process such as image quality correction to an image signal output from the control unit 501, and performs conversion into a resolution matched with the screen of the display unit 509. Also, a display driving unit 508 supplies a pixel signal based on a signal-processed image signal, by sequentially selecting and line sequentially scanning pixels of the display unit 509 for each row.

The display unit 509 has a display panel constituted by a micro display such as an organic EL element or a liquid display panel, for example. A virtual image optical unit 510 performs an enlargement projection for an image such as an AR object displayed on the display unit 509, and causes the enlargement-projected image to be observed by the user as an enlarged virtual image. As a result of this, the user can visually recognize an AR object at the same time as an image of a real space.

An audio processing unit 511 additionally performs sound quality correction, audio amplification, or signal processing of an input audio signal or the like, to an audio signal output from the control unit 501. Also, an audio input and output unit 512 performs external output for the audio after audio processing, and audio input from a microphone (described above).

AR technology is already widely used. According to AR technology, a user can be made to perceive a virtual object (hereinafter, called an "AR object") so as if it is present in a real space. Further, by controlling a binocular parallax, a convergence of both eyes, and a focal length, an AR object can be made to be stereoscopically viewed. Further, by performing a control which changes the drawing of an AR object corresponding to a shadow, a viewpoint position, or a change in a visual line direction, a stereoscopic feeling of the AR object can be produced. In addition, a dialogue system can also be considered in which a person performs an operation to an AR object by a hand or a finger. However, since an AR object is a virtual object not actually present, a sense of touch is not obtained, even if a person performs a contacting or pressing operation, and so it will be difficult for an operation to be understood.

Accordingly, image display technology is proposed, in which is easy to intuitively operate an AR object even if a sense of touch is not obtained by contacting or pressing, by presenting visual feedback to an AR object based on a position relationship with a real object (for example, a hand of a user attempting to operate the AR object), as the technology disclosed in embodiments of the present disclosure. A location of providing feedback, according to embodiments, may be based on a location of a target whose position is indicated by a trajectory direction of the real object, but is not limited thereto.

Here, a method for understanding a position relationship between an AR object and a real object will be described.

FIG. 6 shows an example of a method for understanding a position relationship between an AR object and a real object. The same figure shows a state in which a user wearing the head mounted display 100 is attempting to operate an AR object 601 displayed by the head mounted display 100 with a hand 602 of the user himself or herself. Here, the hand 602 of the user is made a measurement target.

The AR object 601 holds a prescribed shape and size. In the example shown in FIG. 6, in order for simplification, the AR object 601 is arranged in an approximately horizontal plane parallel with the front of the face of the user. Further, the AR object 601 holds a position and posture provided in a real space. The head mounted display 100 renders the AR object 601, so as to be arranged at this position and posture, displays the rendered AR object 601 on the display unit 509, and performs observation to the user through the virtual image optical unit 510.

The outside camera 504 is arranged at approximately the center of the main body front surface of the head mounted display 100, and photographs the scenery in a visual line direction of the user. When the hand 602 of the user enters into a photographic range 603 of the outside camera 504, a position in the real space of the hand 602 of the user within a photographic image can be measured, through a process such as image recognition.

In order to easily set depth information of the hand 602 of the user, a stereoscopic camera may be applied to the outside camera 504, or a distance sensor may be used as well. Further, detection may be easily set from a photographic image of the outside camera 504, by attaching one or a plurality of markers (not illustrated) to a real object which becomes a measurement target, such as the hand 602 of the user.

Note that, strictly speaking, a display coordinate system of the display unit 509 which displays an AR object (or a projection coordinate system which projects an enlarged virtual image of a display image), and a photographic coordinate system of the outside camera 504 which photographs a real object which becomes a measurement target, do not completely match. Hereinafter, in order for a simplification of the description, the display coordinate system and the photographic coordinate system matching or having an error difference will be disregarded, or the succeeding processes will be performed by performing a conversion into an absolute coordinate system.

Further, FIG. 7 shows another example of a method for understanding a position relationship between an AR object and a real object. The same figure shows a state in which a user wearing the head mounted display 100 is attempting to operate an AR object 701 displayed by the head mounted display 100 with a hand of the user himself or herself 702. Here, the hand of the user 702 is made a measurement target (same as above).

The AR object 701 holds a prescribed shape and size. In the example shown in FIG. 7, in order for simplification, the AR object 701 is arranged in an approximately horizontal plane parallel with the front of the face of the user. Further, the AR object 701 holds a position and posture provided in a real space. The head mounted display 100 renders the AR object 701, so as to be arranged at this position and posture, displays the rendered AR object 701 on the display unit 509, and performs observation to the user through the virtual image optical unit 510.

An environment camera 703 is provided on the ceiling or a wall of a room in which the user is present, and performs photography so as to look down on a real space (or a working space of the user) in which the AR object 701 is overlapping. When the hand of the user 702 enters into a photographic range 704 of the environment camera 703, a position in the real space of the hand of the user 702 within a photographic image is measured, through a process such as image recognition.

Note that, the environment camera 703 may be supported by a platform (not illustrated) rotationally moving in each direction of a pan, tilt, and roll. Further, while only one environment camera 703 is drawn in FIG. 7 in order for simplification, two or more environment cameras may be used, in order to obtain three-dimensional position information of the hand of the user 702 which is a measurement target, or in order to enlarge the photographic range 704 (or to not have blind spots occurring).

However, in the context of implementing the technology disclosed in embodiments of the present disclosure, the method which obtains position information of a real object such as a hand of a user is not limited to the methods shown in FIG. 6 and FIG. 7.

B. Visual Feedback Example Corresponding to a Position Relationship Between an AR Object and a Real Object (1)

An AR object, which the head mounted display 100 displays overlapping on a real space, retains position information which includes depth information from a user wearing the head mounted display 100. Also, when measuring position information of a real object (a hand of the user or the like) which is attempting to perform an operation to an AR object, by the methods shown in FIG. 6 or FIG. 7, or a method other than these, depth information between the AR object and the real object is compared, it is determined whether the real object is in front of the AR object, is touching the AR object, or is behind the AR object, and visual feedback is given to the user based on this determination result.

In the case where the real object is in front of the AR object, a user can be made to recognize the AR object as at a position far from the hand of the user himself or herself, by performing a hidden surface process so that the AR object becomes invisible by being hidden by the real object (set so that a part or the entire AR object is not drawn).

FIG. 8 shows a state in which a shadow of a hand of a user is drawn on the surface of an AR object, as an example of visual feedback. In the illustrated example, a virtual light source 801 is provided in the vicinity of a visual line of a user (or the outside camera 504), and irradiation light 802 of this virtual light source 801 draws a shadow 804 shielded by the hand of the user 803 on the surface of an AR object 805. Since a shadow gives a sense of presence or reality to AR, and expresses the presence of a shielding object, it will be a great help to the spacial understanding of the user.

When the virtual light source 801 is made a point light source, this irradiation light 802 extends in a spherical shape. Therefore, the shadow of the hand 804 will become smaller as the hand 803 becomes closer to the AR object 805, and will have a clear outline. Further, when the hand 803 touches the AR object 805, the shadow will almost become invisible. Conversely, the shadow of the hand 804 will become larger as the hand 803 becomes distant from the AR object 805, and will have a blurred outline.

The head mounted display 100 may present feedback by senses other than visually, such as making a warning sound louder in accordance with a distance between the AR object and the real object (or conversely, making quieter), making an amplitude or frequency of vibrations added to the head of the user larger (or conversely, making smaller), or applying heat, in parallel with visual feedback such as the above described drawing a shadow of the real object on the surface of the AR object. Accordingly, the head mounted display 100 may additionally include a device which presents feedback by senses, such as a piezo actuator for generating vibrations, or a heat generation device. By using in combination one or more types of feedback which are presented by senses other than the visual field, with visual feedback using a shadow of a real object, the spacial understanding of an AR object by a user can be additionally supported.

FIG. 9 to FIG. 13 illustrate states in which visual feedback presented to a user is changed in stages in accordance with a distance between a real object and an AR object. However, a position relationship between an AR object arranged in a real space, and a finger of a user attempting to operate the AR object, is shown on the right side of each figure, and a display example of an AR object at the time of each position relationship (an image observed by a user) is shown on the left side of each figure. However, since the real object actually exists and the AR object is virtually present, the "distance" between the real object and the AR object used here is a virtual distance. This virtual distance is calculated based on information of a position at which the AR object is arranged in a virtual real space, and information of a position of a detected real object. Further, the AR object can include a display used for an input operation performed by a user for a real space or a virtual space. A selection operation of options, a pointing operation (input operation of coordinates), or a text input can be included as an input operation of a user. In the examples shown in FIG. 9 to FIG. 13, three menu buttons are included as Graphical Use Interface (GUI) parts.

In the example shown in FIG. 9, a hand of a user 901 is separated far from an AR object 902. Therefore, a shadow of the hand 903 is large, and this outline is drawn blurred.

In the example shown in FIG. 10, a hand 1001 is approaching an AR object 1002. Therefore, whether the hand 1001 is approaching the vicinity of the AR object 1002 is visually expressed, by making a shadow of the hand 1003 smaller than that of the example shown in FIG. 9, and drawing this outline sharper.

In the example shown in FIG. 11, a hand 1101 is touching an AR object 1102. Therefore, a shadow of the hand is almost invisible. Further, whether the vicinity of the AR object 1102 appears to be touched by the hand 1101 (the location which becomes a shortest distance from the tip of the hand 1101) can be calculated, based on a comparison result of depth information between the hand 1101 and the AR object 1102. As illustrated, the spacial understanding of the user can be additionally helped, by performing a drawing process such as causing the portion at which the hand 1101 appears to be touching to be lit up. In the example shown in FIG. 11, a menu button 1103 touched by the hand 1101 is displayed highlighted.

In the example shown in FIG. 12, the tip of a hand 1201 is additionally pushed forward after touching an AR object 1202, and is intersecting with the AR object 1202. The portion, of the tip of the hand 1201, pushed through from the AR object 1202 can be calculated, based on a comparison result of depth information between the hand 1201 and the AR object 1202. Then, when the depth at which the hand 1201 pushes through the AR object 1202 becomes a fixed depth or more, it will be expressed so that the pushed through portion is hidden, by displaying the AR object 1202 overlapping on this portion. Further, by drawing an alarm 1203 (warning feedback) such as causing the portion of the AR object 1202 pushed through by the hand 1202 to be lit up, a warning can be performed so as to finish without additional movement by the user.

In the example shown in FIG. 13, when a hand 1301 is additionally pushed through from an AR object 1302, not only is it no longer possible to operate the AR object 1302, but there is a risk that the hand 1301 will be injured, by colliding with an obstacle (another real object) such as a wall 1303 behind the AR object 1302. In such a case, the user can be made to visually recognize an object which is behind, by causing the display of the AR object 1302 to disappear (or causing it to flash on-off), or by displaying warning feedback such as making it semitransparent. Further, at the time when a real object enters into a prescribed warning range, such as at the time when appearing to hit a wall which is behind or the like, the risk may be avoided, by using together with feedback for senses other than visually, such as a warning sound or a vibrator. While an illustration is omitted, warning feedback may be performed such as changing the color or shape of another real object appearing to collide such as the wall 1303, and the risk may be surely notified to a user.

As shown in FIG. 11, it becomes possible to operate an AR object, in a state where a hand has touched the AR object. However, since there is no feedback by a sense of touch even if touching an AR object, it will be a difficult task to cause the hand to move in a depth direction just touching the AR object, or to keep the hand at this depth position. Accordingly, as shown in FIG. 14, an effective range of operation 1403 by a real object may be set, within a prescribed distance close to in front and behind the depth direction from an AR object 1402. When a hand of the user 1401 enters into the effective range of operation 1403, by regarding that it is touching the AR object 1402, and executing or continuing execution of an operation to the AR object 1402 for which the hand 1401 has moved somewhat in a forward or backward direction, the success rate of the operation by the hand of the user can be improved.

Note that, the user may be prompted to correct a position of the hand 1401 (real object), by being notified that there is actually no contact with the AR object 1402, while allowing a continuous operation of the AR object 1402 within the effective range of operation 1403.

C. Visual Feedback Example Corresponding to a Position Relationship Between an AR Object and a Real Object (2)

In the examples shown in FIG. 8 to FIG. 10, a shadow was used for visual feedback of a distance between a real object and an AR object. Since a shadow gives a sense of presence or reality to AR, and expresses the presence of a shielding object, it will be a great help to the spacial understanding of a user. However, the calculation burden for generating and drawing a shadow in real-time is high, and it will be difficult to draw a complete shadow. In the case where the surface of an AR object has a shape which is uneven and not smooth, the drawing of a shadow will become additionally difficult.

Accordingly, instead of a method which draws a shadow of a real object on an AR object, a presentation method of visual feedback is proposed which draws a ring-shaped indicator of light corresponding to a distance between a real object and an AR object.

FIG. 15 to FIG. 17 illustrate states in which a ring-shaped indicator of light changes in stages in accordance with a distance between a real object and an AR object. However, a position relationship between an AR object arranged in a real space, and a finger of a user attempting to operate the AR object, is shown on the right side of each figure, and a display example of an AR object at the time of each position relationship (an image observed by a user) is shown on the left side of each figure. In order for simplification, a description will be made by using a smooth AR object constituted by a plain texture.

In the example shown in FIG. 15, a hand 1501 is separated far from an AR object 1502. Therefore, a ring-shaped indicator of light 1503 constituted by a large and blurred line is drawn, centered on a point which becomes a shortest distance to the hand 1501, on the surface of the AR object 1502.

In the example shown in FIG. 16, a hand 1601 is approaching an AR object 1602. Therefore, a ring-shaped indicator of light 1603 constituted by a smaller and sharper line than that shown in FIG. 15 is drawn, centered on a point which becomes a shortest distance to the hand 1601, on the surface of the AR object 1602.

In the example shown in FIG. 17, a hand 1701 is touching an AR object 1702 (or enters into an effective range (described above)). A small and sharp ring-shaped indicator of light 1703 is drawn, which specifies the location at which the hand 1701 has touched the AR object 1702.

D. Visual Feedback Example Corresponding to a Position Relationship Between an AR Object and a Real Object (3)

FIG. 8 to FIG. 17 are basically examples of visual feedback performed in the case where operating an AR object from the front surface. In the case where an AR object is arranged separated to some extent from a user, or in the case where an AR object is provided on a desk surface or the like, it may be necessary for the user to operate the AR object from the front surface. Therefore, as can be understood from FIG. 9 to FIG. 11, for example, in the case where operating an AR object from the front surface, at least a part of the surface of the AR object will be hidden by the hand of the user and will be difficult to see, and the AR object will additionally become difficult to see when casting a shadow as visual feedback.

On the other hand, in the case where an AR object can be arranged at a position close to the user, the hand will reach to the opposite surface side of the AR object. By operating an AR object from the opposite surface, it is possible to perform an operation without shielding the AR object.

FIG. 18 to FIG. 20 illustrate states in which an AR object the same as that of the examples shown in FIG. 9 to FIG. 13 is operated by a user from an opposite surface side. However, a position relationship between an AR object arranged in a real space, and a finger of a user attempting to operate the AR object, is shown on the right side of each figure, and a display example of an AR object at the time of each position relationship (an image observed by a user) is shown on the left side of each figure. The AR object is a GUI of an application or game being executed, for example, and includes three menu buttons.

In the example shown in FIG. 18, a hand of a user 1801 is separated from the opposite surface of an AR object 1802. At this stage, visual feedback is not performed at all for the AR object 1802. This is because the AR object 1802 is not able to be operated from the separated hand of the user 1801.

In the example shown in FIG. 19, a hand of a user 1901 is approaching the opposite surface of the AR object 1902. Therefore, visual feedback of the hand 1901 approaching is performed, by emphasizing a display of a menu button 1903, which corresponds to the location at which the hand of the user 1901 is the closest, more than the surroundings.

In the example shown in FIG. 20, a hand of a user 2001 is in contact with the opposite surface of an AR object 2002. Therefore, visual feedback of being touched by the hand 2001 is performed, by switching to a display state in which a menu button 2003 touched by the hand of the user 2001 from the opposite surface side is selected. Note that, it may be a state in which the menu button 2003 is selected, not only the hand of the user 2001 being completely in contact with the opposite surface of the AR object 2002, but also by entering into an effective range within a fixed distance from the opposite surface of the AR object 2002 such as shown in FIG. 14.

If it is an operation from the opposite surface side of an AR object such as shown in FIG. 18 to FIG. 20, the operation can be performed, without shielding the AR object by a real object such as the hand of a user.

E. Color adjustment of visual feedback

FIG. 8 to FIG. 10 have illustrated visual feedback such as drawing a shadow, of a real object in front of an AR object, on the surface of the AR object corresponding to a distance from the AR object. In this way, when visual feedback is drawn on the surface of an AR object, it is possible to cause the visibility of the AR object to be reduced. Accordingly, in the case where visual feedback is drawn on the surface of an AR object, the color may be enhanced, and visual feedback may be performed while retaining the visibility of the user, by mutually drawing the color of the AR object and the color of the visual feedback as contrasting colors.

FIG. 21 shows a state in which a color of a region overlapping with a shadow of the hand of a user 2102, which is visual feedback from within the AR object 2101, is drawn with a contrasting color to that of the shadow of the hand 2102. Further, FIG. 22 conversely shows a state in which a color of a region overlapping with an AR object 2201 from within a shadow of the hand of a user 2202, which is visual feedback, is drawn with a contrasting color to that of the AR object 2201. In both of the examples of FIG. 21 and FIG. 22, a shadow of the forefinger of the user is overlapping with one character "N" from within a character string of "Today's News" drawn on the AR object. As described above, by mutually drawing the color of the AR object and the color of visual feedback as contrasting colors, the character "N" can be recognized, without being buried in the shadow of the forefinger.

F. Limitation of the Feedback Range

FIG. 6 showed a method for understanding a position of a real object (a hand of a user or the like) by using the outside camera 504 included on the head mounted display 100. Further, FIG. 7 showed a method for understanding a position of a real object by using the environment camera 703 provided on the ceiling or a wall of a room in which a user is present. According to these methods, since a position relationship between a real object and an AR object can be understood, if in a photographic range of the camera, it is possible to perform visual feedback in the entire photographic range.

However, in the case where a hand of a user is made a target of visual feedback, it will be sufficient if a position relationship can be understood at the time when overlapping with an AR object, and it may not be necessary to perform visual feedback in the entire photographic range of the camera.

FIG. 23 shows an example in which an effective range of visual feedback is limited. In the same figure, an effective range of visual feedback is limited to a fixed region 2302 enclosing an AR object 2301 viewed by a user. Further, an effective range of visual feedback is limited to a fixed section 2303 including the AR object 2301 viewed by a user, in a depth direction.

By limiting such an effective range of visual feedback, wastefulness such as performing useless visual feedback can be prevented, for an operation in which it is clear that there is not operation to an AR object, such as a user moving a hand around his or her face, for example.

That is, by limiting an effective range of visual feedback, the drawing load can be reduced, and an operation of a user being obstructed due to useless visual feedback can be prevented.

G. Functional Configuration

FIG. 24 schematically shows a functional configuration for performing visual feedback for an operation of a user to an AR object. As described above, visual feedback is basically implemented by giving a visual effect to an image of an AR object, in accordance with position relationship information showing a position relationship (distance of a depth direction or the like) between the AR object, and a real object performing an operation instruction to the AR object. While a calculation process for performing visual feedback can be executed within a display apparatus main body which displays an AR object such as the head mounted display 100, a calculation process may be performed for performing visual feedback in an external apparatus such as a server on a network, or only a display output may be performed in accordance with this calculation result in the display apparatus. In the case of the latter, the display apparatus may transmit a result which measures position information of a real object (a hand of a user or the like) to the server. Further, it is also possible for a calculation process for performing visual feedback to be implemented, not as a special hardware apparatus, but by a computer program written in a computer-readable format so as to implement prescribed processes on a computer. Such a computer program is recorded in a computer-readable storage medium, or is delivered via a wired or wireless communication route.

The AR information acquisition unit 2401 acquires AR information such as a position, posture, size, or texture related to an AR object to be displayed overlapping on a real space, generated by an AR object generation unit (an illustration is omitted) such as an application on a PC, a navigation system, or a game device. An image processing apparatus such as the head mounted display 100 is connected to an external AR object generation unit via a wired or wireless communication unit 505. Alternatively, the AR object generation unit may be included within the image processing apparatus.

The real object detection unit 2402 detects a position, posture, or size of a real object (a hand of a user or the like), which is a target of visual feedback, for example, by performing image recognition for a photographic image of the outside camera 504. Alternatively, the real object detection unit 2402 detects a position, posture, or size of a real object by image recognition, by receiving a photographic image of the environment camera 703 via the communication unit 505. Alternatively, the real object detection unit 2402 may receive, via the communication unit 505, information of a position, posture, or size of a real object, which is obtained by having an external apparatus (not illustrated) recognize a photographic image of the environment camera 703.

Note that, it may not be necessary for the real object detection unit 2402 to detect all of the real objects included in a photographic image of the outside camera 504 or the environment camera 703. For example, a detection target may be limited to a prescribed object attempting to perform an operation to an AR object, such as a hand of a user or a pointer which a user is gripping. This is because it may not be necessary for an object not able to perform an operation to an AR object to perform visual feedback.

A between-objects relationship determination unit 2403 acquires position relationship information showing a position relationship between an AR object and a real object, and generates control information for giving a visual effect corresponding to the position relationship information to an image of the AR object, by comparing a position posture of the AR object generated by the AR information acquisition unit 2401, and a position posture of the real object detected by the object detection unit 2402, and by determining a position relationship between the AR object and the real object (that is, whether the real object is in front of the AR object, touching the AR object, or behind the AR object).

Note that, it may not be necessary for the between-objects relationship determination unit 2403 to make all of the real objects in a photographic range of the outside camera 504 or the environment camera 703 a target of determination. For example, a determination process of a position relationship may be performed, by limiting to a real object present in an effective range of visual feedback such as shown in FIG. 23. By limiting an effective range of visual feedback, the drawing load of an AR object of a later stage can be reduced, and an operation of a user being obstructed due to useless visual feedback can be prevented.

Further, the between-objects relationship determination unit 2403 may determine that a real object is touching an AR object, not only in a state where the real object is just touching the AR object, by also in a state within an effective range of operation set to a prescribed distance close to in front and behind a depth direction from the AR object (refer to FIG. 14). By setting an effective range of operation by the real object, the success rate of the operation to the AR object by the real object can be improved.

An AR image rendering unit 2404 performs rendering for an AR image to be displayed in a real space, based on AR information such as a position, posture, size, or texture of an AR object acquired by the AR information acquisition unit 2401.

In an embodiment, there is a main feature in which the AR image rendering unit 2404 gives visual feedback, that is, a visual effect expressing that an AR object has been operated by a real object, to the AR object, in accordance with control information generated based on position relationship information showing a position relationship between the AR object and the real object by the between-objects relationship determination unit 2403. A specific example of visual feedback can include drawing a shadow of a real object on the surface of an AR object (for example, refer to FIG. 8 to FIG. 10), displaying a ring-shaped indicator of light, which shows that a real object is approaching an AR object (for example, refer to FIG. 15 to FIG. 17), or the like. However, the display method of visual feedback is not limited to these.

An overlapping display unit 2405 displays an AR image drawn by the AR image rendering unit 2404 overlapping on a real space. For example, in the case where the image display apparatus is the transmission-type head mounted display 100, the overlapping display unit 2405 displays an AR image at an appropriate pixel position of a display panel, so that the AR object is observed by a user with the position and posture of the AR object determined by the AR information acquisition unit 2401. Further, in the case where the image display apparatus is the immersive-type head mounted display 300, the overlapping display unit 2405 overlaps an AR image at an appropriate location on a surrounding image (a video through image) photographed by an outside camera.

FIG. 25 shows a process procedure for performing a drawing process for an AR image attached to visual feedback in the form of a flow chart, in an image processing apparatus including the functional configuration shown in FIG. 24.

First, the AR information acquisition unit 2401 acquires AR information such as a position, posture, or size related to an AR object to be displayed overlapping on a real space (step S2501).

Further, the real object detection unit 2402 detects a position, posture, or size of a real object (a hand of a user or the like), which is a target of visual feedback, based on a result or the like in which image recognition is performed for a photographic image of the outside camera 504 or the environment camera 703 (step S2502).

Then, the between-objects relationship determination unit 2403 performs a depth determination of the AR object and the real object, based on information acquired in the preceding steps S2501 and S2502, and determines whether or not the real object is in front of the AR object (in other words, whether the AR object is shielded by the real object) (step S2503).

Here, in the case where it is determined that the real object is in front of the AR object (Yes in step S2503), the between-objects relationship determination unit 2403 additionally checks whether the real object is present within an effective range of visual feedback (refer to FIG. 23) (step S2504).

In the case where the real object is present within an effective range of visual feedback (Yes in step S2504), the AR image rendering unit 2404 executes a drawing process of visual feedback of the real object approaching the AR object (step S2505). The details of the drawing process of visual feedback of the real object approaching the AR object will be described later.

On the other hand, in the case where the real object is in front of the AR object, and is not present within an effective range of visual feedback (No in step S2504), it may not able to be said that the real object is approaching the AR object (or the real object is attempting to operate the AR object), and so the AR image rendering unit 2404 executes a usual drawing process of the AR object, which does not include visual feedback (step S2506). However, since the real object is in front of the AR object, a hidden surface process is performed for the region shielded by the real object.

Further, in the case where the real object is not in front of the AR object (No in step S2503), the between-objects relationship determination unit 2403 additionally checks whether the real object is behind the AR object (step S2507).

Here, in the case where the real object is behind the AR object (Yes in step S2507), the AR image rendering unit 2404 executes a drawing process of visual feedback of the real object which is behind the AR object (step S2508). The details of the drawing process of visual feedback of the real object which is behind the AR object will be described later.

On the other hand, in the case where the real object is not in front or behind the AR object (No in step S2507), the AR image rendering unit 2404 executes a usual drawing process of the AR object, which does not include visual feedback (step S2509). In this case, since the real object is not overlapping with the AR object (not shielding) in the visual field of a user, a hidden surface process of the AR object may not be necessary.

FIG. 26 shows a process procedure for drawing visual feedback of a real object approaching an AR object in the form of a flow chart, performed in step S2505 of the flow chart shown in FIG. 25.

First, the between-objects relationship determination unit 2403 checks whether or not the real object is not in contact with the AR object (step S2601).

The between-objects relationship determination unit 2403 determines that a real object is touching the AR object, not only in a state where the real object is just touching the AR object, but also in a state within an effective range of operation set to a prescribed distance close to in front and behind the depth direction from the AR object (refer to FIG. 14). By setting an effective range of operation by the real object, the success rate of the operation to the AR object by the real object can be improved.

Here, in the case where the real object is in contact with the AR object (No in step S2601), the AR image rendering unit 2404 generates visual feedback at the time when the real object is in contact with the AR object (step S2604).

In the case where a shadow of the real object corresponding to a distance from the AR object is used, as visual feedback, a shadow which is almost invisible will be generated. Further, an effect such as causing the portion which the real object is touching to be lit up may be added to the visual feedback (for example, refer to FIG. 11).

Alternatively, in the case where a ring-shaped indicator of light with a size corresponding to a distance from the AR object is used, as visual feedback, a ring of light which is small and sharp will be generated, at the portion which the real object is touching (for example, refer to FIG. 17).

Further, in the case where the real object is not in contact with the AR object (Yes in step S2601), the between-objects relationship determination unit 2403 additionally checks whether or not the real object is intersecting with the AR object (step S2602).

In the case where the real object is not intersecting with the AR object (No in step S2602), the AR image rendering unit 2404 generates visual feedback corresponding to a distance between the AR object and the real object (step S2605).

For example, a shadow of the real object having a size and sharpness corresponding to a distance from the AR object is generated as visual feedback (for example, refer to FIG. 9 and FIG. 10). Alternatively, a ring-shaped indicator of light having a size and sharpness corresponding to a distance from the AR object is generated as visual feedback (for example, refer to FIG. 15 and FIG. 16).

Further, in the case where the real object is intersecting with the AR object (Yes in step S2602), the between-objects relationship determination unit 2402 additionally checks whether or not the real object pushing through the AR object has entered into a warning range in which there is the possibility of colliding with an obstacle (another real object) such as a wall behind the AR object (step S2603).

If the real object is outside of the warning range (No in step S2603), the AR image rendering unit 2404 performs a drawing process for the AR object intersecting with the real object (step S2606).

On the other hand, in the case where the real object enters into the warning range (Yes in step S2603), the AR image rendering unit 2404 causes the display of the AR object 1302 to disappear (or causing it to flash on-off), or generates warning feedback for a user to be able to visually confirm an object behind the AR object, such as making it semitransparent.

Then, the AR image rendering unit 2404 performs a drawing process for the AR object, while performing a hidden surface process for the region shielded by the real object (step S2608).

To continue, the AR image rendering unit 2404 ends the present process routine, by performing a drawing process for the visual feedback generated by any of the preceding steps S2604 to S2607, while performing a hidden surface process for the region shielded by the real object (step S2609). In the case where drawing visual feedback on the surface of the AR object, the AR image rendering unit 2404 may cause the color to be enhanced, and may perform visual feedback while retaining the visibility of the user, by mutually drawing the color of the AR object and the color of the visual feedback as contrasting colors (refer to FIG. 21 and FIG. 22).

FIG. 27 shows a process procedure for drawing visual feedback of a real object behind an AR object in the form of a flow chart, performed in step S2505 of the flow chart shown in FIG. 25.

First, the between-objects relationship determination unit 2403 checks whether or not the real object is present within an effective range of visual feedback (refer to FIG. 23) (step S2701).

In the case where the real object is not present within an effective range of visual feedback (No in step S2701), it is not assumed that the real object performs an operation to the AR object, and it may not be necessary to draw this visual feedback, and so the present process routine ends, by skipping all of the succeeding processes. By limiting such an effective range of visual feedback, the drawing load of an AR object of a later stage can be reduced, and an operation of a user being obstructed due to useless visual feedback can be prevented.

On the other hand, in the case where the real object is present within an effective range of visual feedback (Yes in step S2701), the AR image rendering unit 2404 generates visual feedback corresponding to a distance between the AR object and the real object, such as shown in FIG. 18 to FIG. 20, for example (step S2702).

Then, the AR image rendering unit 2404 ends the present process routine, by performing a drawing process for the AR object (step S2703), and subsequently, performing a drawing process for the visual feedback generated in step S2702 (step S2703).

In this way, according to the technology disclosed in embodiments of the present disclosure, at the time when a user is attempting to perform an operation by his or her hand or the like to an AR object, under an environment which observes a real space in which the AR object is displayed, it can be intuitively known how far the AR object is separated from the user himself or herself, through visual feedback. Further, it becomes easy for a user to touch a position aimed at an AR object, by making visual feedback a clue.

Further, according to the technology disclosed in embodiments of the present disclosure, it becomes easy to also use an AR object as an input mechanism such as a touch panel, by not only simply displaying an AR object overlapping on a real space, but also adding UI parts such as menu buttons.

Further, according to the technology disclosed in embodiments of the present disclosure, since space perception becomes easy by adding visual feedback to an AR object, a user can easily perform an operation such as touching a complex three-dimensional shaped AR object.

INDUSTRIAL APPLICABILITY

Heretofore, the technology disclosed in embodiments of the present disclosure has been described in detail, while referring to specific embodiments. However, it is evident that a person skilled in the art can perform corrections or substitutions in a range which does not deviate from the content of the technology disclosed in the specifically-described embodiments of the present disclosure.

The technology disclosed in embodiments of the present disclosure can be applied to various image display apparatuses, such as a head mounted display, a head-up display, a small-sized information terminal such as a smartphone or a tablet, a navigation system, or a game device, as a device which presents an AR object. While the present specification and the attached figures only describe a two-eye type head mounted display, it is needless to say that the technology disclosed in embodiments of the present disclosure can similarly be applied to a single-eye type head mounted display.

While the calculation process for performing visual feedback can be executed within a display apparatus main body which displays an AR object such as a head mounted display, a calculation process for performing visual feedback can be performed in an external apparatus such as a server on a network, and only a display output can be performed in accordance with this calculation result in the display apparatus.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
circuitry configured to
acquire information indicating a spatial relationship between a real object and a virtual object, and
initiate generation of a user feedback based on the acquired information, the user feedback being displayed to be augmented to a generated image obtained based on capturing by an imaging device, or augmented to a perceived view of the real world,
wherein a characteristic of the user feedback is changed when the spatial relationship between the real object and the virtual object changes.

(2) The information processing apparatus according to (1), wherein a size of display of the user feedback is changed as the spatial relationship between the real object and the virtual object is changed.

(3) The information processing apparatus according to (1) or (2), wherein a size of display of the user feedback is displayed to be smaller as the real object becomes closer to the virtual object.

(4) The information processing apparatus according to any of (1) to (3), wherein a shape of display of the user feedback is changed when the spatial relationship between the real object and the virtual object is changed.

(5) The information processing apparatus according any of (1) to (4), wherein a visual quality of display of the user feedback is changed as the spatial relationship between the real object and the virtual object is changed.

(6) The information processing apparatus according to any of (1) to (5), wherein at least one of a color, a brightness, or transmittance of display of the user feedback is changed as the spatial relationship between the real object and the virtual object is changed.

(7) The information processing apparatus according to any of (1) to (6), wherein the color of display of the user feedback is displayed to be lighter as the real object becomes closer to the virtual object.

(8) The information processing apparatus according to any of (1) to (7), wherein a movement of display of the user feedback is changed as the spatial relationship between the real object and the virtual object is changed.

(9) The information processing apparatus according to any of (1) to (8), wherein at least a position, a vibration, or a trajectory of display of the user feedback is changed as the spatial relationship between the real object and the virtual object is changed.

(10) The information processing apparatus according to any of (1) to (9), wherein at least a portion of the virtual object is not displayed as the real object approaches the virtual object.

(11) The information processing apparatus according to any of (1) to (10), wherein at least a portion of the virtual object is lighted up as the real object approaches the virtual object.

(12) The information processing apparatus according to any of (1) to (11), wherein the spatial relationship includes a distance between the real object and the virtual object.

(13) The information processing apparatus according to any of (1) to (12), wherein the characteristic of the user feedback is changed based on whether the real object is within a predetermined distance from the virtual object.

(14) The information processing apparatus according to any of (1) to (13), wherein a characteristic of the user feedback which is changed in a case that the real object is within the predetermined distance from the virtual object is different from a characteristic of the user feedback which is changed in a case that the real object is not within the predetermined distance from the virtual object.

(15) The information processing apparatus according to any of (1) to (14), wherein the circuitry is further configured to set the predetermined distance in front of and behind the virtual object as a range of operation of the virtual object.

(16) The information processing apparatus according to any of (1) to (15), wherein the virtual object overlaps the real object when the real object is pushed through a location corresponding to a display position of the virtual object.

(17) The information processing apparatus according to any of (1) to (16), wherein a warning feedback is given when the real object is pushed through a location corresponding to a display position of the virtual object.

(18) The information processing apparatus according to any of (1) to (17), wherein display of at least a portion of the virtual object is terminated when the real object is pushed through a location corresponding to a display position of the virtual object.

(19) The information processing apparatus according to any of (1) to (18), wherein the user feedback includes a display portion for an input operation performed by a user.

(20) The information processing apparatus according to any of (1) to (19), wherein the spatial relationship includes at least one of a distance, a direction, or posture information between the real object and virtual object.

(21) The information processing apparatus according to any of (1) to (20), wherein the user feedback includes a sound or a vibration.

(22) The information processing apparatus according to any of (1) to (21), wherein the user feedback is stereoscopically displayed.

(23) The information processing apparatus according to any of (1) to (22), wherein the characteristic of the user feedback is changed stepwise or in relation to a changing of the spatial relationship between the real object and the virtual object.

(24) The information processing apparatus according to any of (1) to (23), wherein a magnitude of the characteristic of the user feedback is changed in relationship to a changing of the spatial relationship between the real object and the virtual object.

(25) The information processing apparatus according to any of (1) to (24), wherein a location of displaying the user feedback is determined based on a location of a target whose position is indicated by a trajectory direction of the real object.

(26) An information processing method including:
acquiring information indicating a spatial relationship between a real object and a virtual object;
generating a user feedback based on the acquired information and displaying the user feedback to be augmented to a generated image obtained based on capturing by an imaging device, or augmented to a perceived view of the real word,
wherein a characteristic of the user feedback is changed when the spatial relationship between the real object and the virtual object changes.

(27) A non-transitory computer-readable medium having embodied thereon a program, which when executed by a computer causes the computer to execute a method, the method including:
acquiring information indicating a spatial relationship between a real object and a virtual object;
generating a user feedback based on the acquired information; and
displaying the user feedback to be augmented to a generated image obtained based on capturing by an imaging device, or augmented to a perceived view of the real word,
wherein a characteristic of the user feedback is changed when the spatial relationship between the real object and the virtual object changes.

(28) An information processing apparatus including:
an acquisition unit which acquires position relationship information showing a position relationship between a virtual object visually recognized by a user at a same time as an image of a real space, and a real object performing an operation instruction to the virtual object; and
a generation unit which generates control information for controlling an output based on the position relationship information,
wherein the generation unit,
in a case where it is decided the virtual object and the real object have a first position relationship based on the position relationship information, generates first control information for performing a first output, and
in a case where it is decided the virtual object and the real object have a second position relationship different to the first position relationship based on the position relationship information, generates second control information for performing a second output different to the first output.

(29) The information processing apparatus according to (28),
wherein, in a case where it is decided the virtual object and the real object have a third position relationship different to both of the first and the second position relationships based on the position relationship information, the generation unit generates third control information for performing a third output different to both of the first and the second outputs.

(30) The information processing apparatus according to (29),
wherein the generation unit generates the first, second, and third control information for respectively performing the first, second, and third outputs including visual information.

(31) The information processing apparatus according to (30),
wherein the generation unit generates the first to third control information for performing an output which adds a visual effect to an image of the virtual object in at least one output from among the first to third outputs.

(32) The information processing apparatus according to (28),
wherein the generation unit generates control information for performing an output which includes information showing a distance between the virtual object and the real object.

(33) The information processing apparatus according to (28),
wherein the generation unit generates control information for performing an output which includes information showing a distance in a depth direction seen from the user between the virtual object and the real object.

(34) The information processing apparatus according to (31),
wherein, in a case where it is decided the real object is in front of the virtual object, in a case where it is decided the real object is in contact with the virtual object, or in a case where it is decided the real object is behind the virtual object, the generation unit generates the control information for performing an output having a different visual effect.

(35) The information processing apparatus according to any of (28) and (29),
wherein, at the time when the real object is present in an effective range of operation set within a prescribed distance in front and behind the virtual object, the generation unit generates control information for performing an output showing the real object is in contact with the virtual object.

(36) The information processing apparatus according to (35), wherein the generation unit generates control information for prompting the user to correct a position of the real object by notifying the user that the real object is not in contact with the virtual object while allowing a continuous operation of the virtual object within the effective range of operation.

(37) The information processing apparatus according to any of (28) to (35), wherein, only in a case where the real object is present within an effective range of a visual effect set for the virtual object, the generation unit generates control information for outputting a visual effect to an image of the virtual object.

(38) The information processing apparatus according to (37), wherein the generation unit sets an effective range of the visual effect to a fixed range which includes the virtual object.

(39) The information processing apparatus according to any of (28) to (38), wherein, in a case where the real object is in front of the virtual object or is in contact with the virtual object, the generation unit generates control information for outputting a visual effect on the virtual object.

(40) The information processing apparatus according to (39), wherein the generation unit generates control information for outputting, as the visual effect, a shadow of the real object having a size and sharpness corresponding to a distance from the virtual object to the real object.

(41) The information processing apparatus according to (39), wherein the generation unit generates control information for outputting, as the visual effect, a ring-shaped indicator of light having a size and sharpness corresponding to a distance from the virtual object to the real object.

(42) The information processing apparatus according to (39), wherein, at a time when the real object is intersecting with the virtual object, the generation unit generates control information for outputting a warning.

(43) The information processing apparatus according to (42), wherein the generation unit outputs a warning sound showing danger of the real object colliding with another real object present behind the virtual object, or generates control information for outputting a warning including a visual effect where a color of the another real object is changed.

(44) The information processing apparatus according to (39), wherein the generation unit generates control information for outputting an visual effect for drawing the virtual object by taking into consideration a shielding region by the real object.

(45) The information processing apparatus according to (39), wherein the generation unit generates control information for outputting the visual effect by taking into consideration a shielding region by the real object.

(46) The information processing apparatus according to any of (28) to (38), wherein, in a case where the real object is behind the virtual object, the generation unit generates control information for outputting a visual effect corresponding to a distance from the virtual object to the real object.

(47) The information processing apparatus according to (28), where the generation unit generates control information for outputting the visual effect with a contrasting color to that of the virtual object.

(48) The information processing apparatus according to (28), wherein the generation unit generates control information for outputting a visual effect which draws a portion to add the visual effect from within the virtual object with a contrasting color to an original color.

(49) An information processing method including:

acquiring position relationship information showing a position relationship between a virtual object visually recognized by a user at a same time as an image of a real space, and a real object performing an operation instruction to the virtual object; and generating control information for controlling an output based on the position relationship information, wherein, generating control information includes, in a case where it is decided the virtual object and the real object have a first position relationship based on the position relationship information, generating first control information for performing a first output, and in a case where it is decided the virtual object and the real object have a second position relationship different to the first position relationship based on the position relationship information, generating second control information for performing a second output different to the first output.

(50) An image display apparatus including:

a display unit which displays a virtual object so as to be visually recognized by a user at the same time as an image of a real space, an acquisition unit which acquires position relationship information showing a position relationship between the virtual object, and a real object performing an operation instruction to this virtual object, and a generation unit which generates control information for controlling an output of the display unit showing a position relationship between the virtual object and the real object, based on the position relationship information, wherein the generation unit, in the case where it is decided that the virtual object and the real object have a first position relationship based on the position relationship information, generates first control information for the display unit to perform a first output, and in the case where it is decided that the virtual object and the real object have a second position relationship different to the first position relationship based on the position relationship information, generates second control information for the display unit to perform a second output different to the first output.

(51) The image display apparatus according to (50), further including a virtual object generation unit which generates the virtual object.

(52) An image display method, including:

acquiring position relationship information showing a position relationship between a virtual object visually recognized by a user at the same time as an image of a real space, and a real object performing an operation instruction to this virtual object, generating control information for controlling an output based on the position relationship information, and displaying the virtual object so as to show a position relationship with the real object, based on the control information, wherein, generating control information includes,
in the case where it is decided that the virtual object and the real object have a first position relationship based on the position relationship information, generating first control information for performing a first output by the displaying, and
in the case where it is decided that the virtual object and the real object have a second position relationship different to the first position relationship based on the position relationship information, generating second control information for performing a second output different to the first output by the displaying.

(53) A computer program written in a computer-readable format so as to cause a computer to function as:
an acquisition unit which acquires position relationship information showing a position relationship between a virtual object visually recognized by a user at a same time as an image of a real space, and a real object performing an operation instruction to the virtual object; and
a generation unit which generates control information for controlling an output based on the position relationship information,
wherein the generation unit,
in a case where it is decided the virtual object and the real object have a first position relationship based on the position relationship information, generates first control information for performing a first output, and
in a case where it is decided the virtual object and the real object have a second position relationship different to the first position relationship based on the position relationship information, generates second control information for performing a second output different to the first output.

REFERENCE SIGNS LIST 100 head mounted display
101L, 101R virtual image optical unit
102 supporting body
103L, 103R microphone
104L, 104R display panel
300 head mounted display
303L, 303R microphone
304L, 304R display panel
305 outside camera
306 interpupillary adjustment mechanism
501 control unit
501A ROM
501B RAM
502 input operation unit
503 remote control reception unit
504 outside camera
505 communication unit
506 storage unit
507 image processing unit
508 display driving unit
509 display unit
510 virtual image optical unit
511 audio processing unit
512 audio input and output unit
703 environment camera
2401 AR information acquisition unit
2402 real object detection unit
2403 between-objects relationship determination unit
2404 AR image rendering unit
2405 Overlapping display unit

The invention claimed is:

1. An information processing apparatus, comprising:
a sensor configured to acquire positional information of a real object in front of a user of a head-mounted display, the real object being operated by the user in a real space; and
a control unit configured to:
access a program that is recorded in a memory for the head-mounted display;
control, based on the accessed program, the head-mounted display to display a first virtual object over a view of a real world;
acquire the positional information from the sensor;
determine, based on the positional information, a spatial relationship between the real object and the first virtual object;
control the head-mounted display to display a second virtual object over the first virtual object based on the spatial relationship, wherein a position of the second virtual object corresponds to a position of the real object; and
control the head-mounted display to change display of the second virtual object when the spatial relationship between the real object and the first virtual object changes.

2. The information processing apparatus according to claim 1,
wherein the spatial relationship represents a distance between a hand of the user and the first virtual object, and
wherein the control unit is further configured to control the head-mounted display to change a size of the display of the second virtual object as the distance between the real object and the first virtual object is changed.

3. The information processing apparatus according to claim 2, wherein the control unit is further configured to control the head-mounted display to decrease a size of the second virtual object as the distance between the real object and the first virtual object decreases.

4. The information processing apparatus according to claim 2, wherein the control unit is further configured to control the head-mounted display to change a shape of the second virtual object based on the distance between the real object and the first virtual object and a 3D shape of the first virtual object.

5. The information processing apparatus according to claim 1, wherein the control unit is further configured to control the head-mounted display to change a visual quality of the second virtual object as the spatial relationship between the real object and the first virtual object.

6. The information processing apparatus according to claim 5, wherein the control unit is further configured to control the head-mounted display to change at least one of a color, a brightness, or transmittance of display of the second virtual object as the spatial relationship between the real object and the first virtual object is changed.

7. The information processing apparatus according to claim 6, wherein the control unit is further configured to control the head-mounted display to set the color of the second virtual object lighter as the real object becomes closer to the first virtual object.

8. The information processing apparatus according to claim 1, wherein the control unit is further configured to control the head-mounted display to move a position of the second virtual object as the spatial relationship between the real object and the first virtual object is changed.

9. The information processing apparatus according to claim 1, wherein at least a portion of the first virtual object is not displayed as the real object approaches the first virtual object.

10. The information processing apparatus according to claim 1, wherein at least a portion of the first virtual object is lighted up as the real object approaches the first virtual object.

11. The information processing apparatus according to claim 1, wherein the spatial relationship includes a distance between the real object and the first virtual object.

12. The information processing apparatus according to claim 11, wherein a characteristic of the second virtual object is changed based on whether the real object is within a predetermined distance from the first virtual object.

13. The information processing apparatus according to claim 12, wherein the characteristic of the second virtual object which is changed in a case that the real object is within the predetermined distance from the first virtual object is different from a characteristic of the second virtual object which is changed in a case that the real object is not within the predetermined distance from the first virtual object.

14. The information processing apparatus according to claim 12, wherein the control unit is further configured to set the predetermined distance in front of and behind the first virtual object as a range of operation of the first virtual object.

15. The information processing apparatus according to claim 1, wherein the first virtual object overlaps the real object when the real object is pushed through a location corresponding to a display position of the first virtual object.

16. The information processing apparatus according to claim 1, wherein a warning feedback is given when the real object is pushed through a location corresponding to a display position of the first virtual object.

17. The information processing apparatus according to claim 1, wherein display of at least a portion of the first virtual object is terminated when the real object is pushed through a location corresponding to a display position of the first virtual object.

18. The information processing apparatus according to claim 1, wherein the second virtual object includes a display portion for an input operation performed by the user.

19. The information processing apparatus according to claim 1, wherein the spatial relationship includes at least one of a distance, a direction, or posture information between the real object and the first virtual object.

20. The information processing apparatus according to claim 1, wherein a characteristic of the second virtual object is changed stepwise or in relation to a changing of the spatial relationship between the real object and the first virtual object.

21. The information processing apparatus according to claim 1, wherein a magnitude of a characteristic of the second virtual object is changed in relationship to a changing of the spatial relationship between the real object and the first virtual object.

22. The information processing apparatus according to claim 1,
wherein the head-mounted display is an optical see-through head mounted display, and
wherein the control unit is further configured to control the optical see-through head mounted display to display the first virtual object and the second virtual object over the view of the real world.

23. The information processing apparatus according to claim 22, wherein the control unit is further configured to control the optical see-through head mounted display to display the first virtual object and the second virtual object stereoscopically.

24. The information processing apparatus according to claim 1,
wherein the head-mounted display is a smartphone,
wherein the sensor is an imaging device that is installed in the smartphone and configured to capture the real world, and
wherein the control unit is further configured to control the smartphone to display the view of the real world, the first virtual object, and the second virtual object simultaneously.

25. An information processing method, comprising:
controlling a mobile display terminal to display a first virtual object over a view of a real world;
acquiring, from a sensor, positional information of a real object that is operated by a user of the mobile display terminal in a real space;
determining, based on the positional information, a spatial relationship between the real object and the first virtual object;
controlling the mobile display terminal to display a second virtual object over the first virtual object based on the spatial relationship, wherein a position of the second virtual object corresponds to a position of the real object; and
controlling the mobile display terminal to change display of the second virtual object when the spatial relationship between the real object and the first virtual object changes.

26. A non-transitory computer-readable medium having stored thereon computer-executable instructions, which when executed by a computer cause the computer to execute operations, the operations comprising:
controlling a mobile display terminal to display a first virtual object over a view of a real world;
acquiring, from a sensor, positional information of a real object that is operated by a user of the mobile display terminal in a real space;
determining, based on the positional information, a spatial relationship between the real object and the first virtual object;
controlling the mobile display terminal to display a second virtual object over the first virtual object based on the spatial relationship, wherein a position of the second virtual object corresponds to a position of the real object; and
controlling the mobile display terminal to change display of the second virtual object when the spatial relationship between the real object and the first virtual object changes.

* * * * *